(12) United States Patent
Takeda et al.

(10) Patent No.: US 11,218,883 B2
(45) Date of Patent: Jan. 4, 2022

(54) USER TERMINAL, RADIO BASE STATION, RADIO COMMUNICATION METHOD AND RADIO COMMUNICATION SYSTEM

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP); Lihui Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/244,969

(22) Filed: Jan. 10, 2019

(65) Prior Publication Data
US 2019/0150000 A1 May 16, 2019

Related U.S. Application Data

(63) Continuation of application No. 15/500,635, filed as application No. PCT/JP2015/068990 on Jul. 1, 2015, now abandoned.

(51) Int. Cl.
*H04W 4/00* (2018.01)
*H04W 16/14* (2009.01)
(Continued)

(52) U.S. Cl.
CPC ............ *H04W 16/14* (2013.01); *H04L 5/001* (2013.01); *H04L 5/0007* (2013.01); *H04L 5/0098* (2013.01); *H04L 5/14* (2013.01); *H04L 27/0006* (2013.01); *H04W 16/32* (2013.01); *H04W 72/0446* (2013.01); *H04W 74/0808* (2013.01)

(58) Field of Classification Search
None
See application file for complete search history.

(56) References Cited

U.S. PATENT DOCUMENTS

2005/0026639 A1* 2/2005 Lewis ................ H04W 74/085
455/509
2010/0098012 A1 4/2010 Bala et al.
(Continued)

FOREIGN PATENT DOCUMENTS

GB 2498988 A 8/2013
WO 2013/112983 A2 8/2013
WO 2013-126858 A1 8/2013

OTHER PUBLICATIONS

International Search Report issued in PCT/JP2015/068990 dated Sep. 1, 2015 (1 page).
(Continued)

*Primary Examiner* — Zewdu A Beyen
(74) *Attorney, Agent, or Firm* — Osha Bergman Watanabe & Burton LLP

(57) ABSTRACT

A user terminal is disclosed that includes a processor that determines a predetermined period based on information about a configuration of sensing. The user terminal further includes a receiver that performs a sensing before transmitting signals in the predetermined period. A radio communication method for a user terminal is also disclosed that includes determining a predetermined period based on information about the configuration of sensing and performing a sensing before transmitting signals in the predetermined period.

4 Claims, 19 Drawing Sheets

(51) Int. Cl.
*H04W 16/32* (2009.01)
*H04L 5/00* (2006.01)
*H04L 27/00* (2006.01)
*H04L 5/14* (2006.01)
*H04W 72/04* (2009.01)
*H04W 74/08* (2009.01)

(56) References Cited

U.S. PATENT DOCUMENTS

| | | | |
|---|---|---|---|
| 2013/0163543 A1* | 6/2013 | Freda | H04W 16/14 370/329 |
| 2013/0208587 A1* | 8/2013 | Bala | H04W 16/14 370/230 |
| 2013/0286882 A1* | 10/2013 | Lim | H04W 72/0406 370/252 |
| 2013/0322279 A1 | 12/2013 | Chincholi et al. | |
| 2013/0343288 A1 | 12/2013 | Ratasuk et al. | |
| 2013/0343305 A1 | 12/2013 | Kwon et al. | |
| 2014/0192767 A1* | 7/2014 | Au | H04W 74/0866 370/330 |
| 2015/0057011 A1 | 2/2015 | Di Girolamo et al. | |
| 2015/0365790 A1* | 12/2015 | Edge | H04W 4/90 455/404.2 |
| 2015/0365880 A1 | 12/2015 | Malladi et al. | |
| 2016/0164644 A1 | 6/2016 | Charbit et al. | |

OTHER PUBLICATIONS

Written Opinion of the International Searching Authority issued in PCT/JP2015/068990 dated Sep. 1, 2015 (3 pages).
3GPP TS 36.300 V8.5.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall Description; Stage 2 (Release 8)"; May 2008 (134 pages).
Office Action in counterpart Japanese Patent Application No. 2019-205979 dated Sep. 23, 2020 (6 pages).
Office Action issued in Japanese Application No. 2016-538231; dated Jan. 31, 2019 (6 pages).
Office Action issued in Chinese Application No. 201580041235.8; dated May 13, 2020 (17 pages).

* cited by examiner

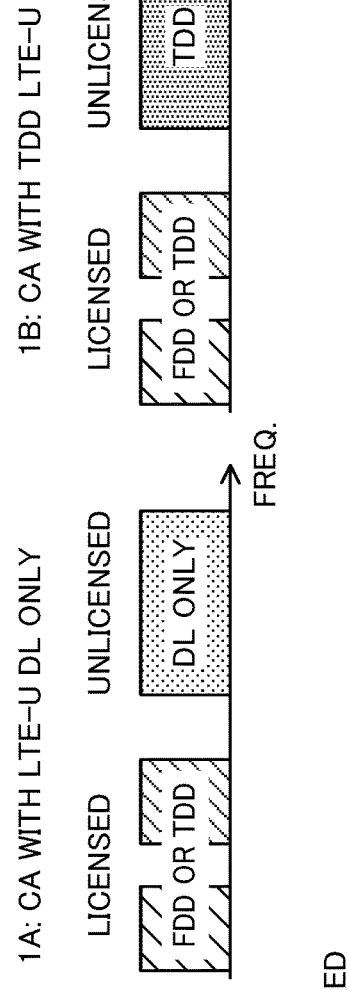
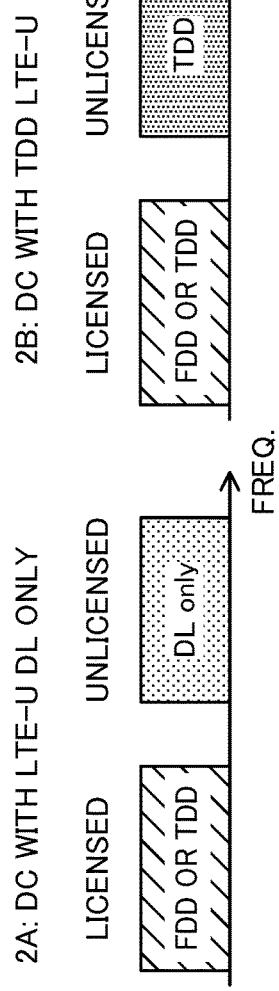
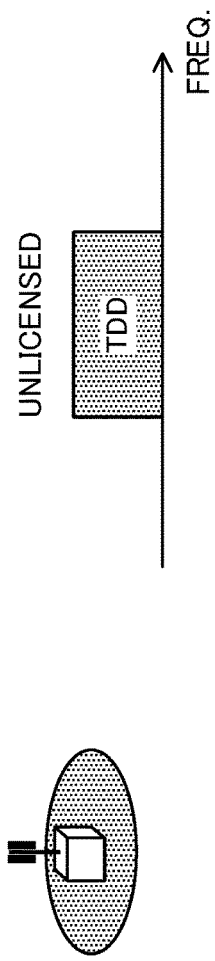
FIG.1A
FIG.1B
FIG.1C

| SPECIAL SUBFRAME CONFIG. | NORMAL CYCLIC PREFIX IN DOWNLINK | | | EXTENDED CYCLIC PREFIX IN DOWNLINK | | |
|---|---|---|---|---|---|---|
| | DwPTS | GP | UpPTS | DwPTS | GP | UpPTS |
| 0 | 3 | 10 | 1 | 3 | 8 | 1 |
| 1 | 9 | 4 | 1 | 8 | 3 | 1 |
| 2 | 10 | 3 | 1 | 9 | 2 | 1 |
| 3 | 11 | 2 | 1 | 10 | 1 | 1 |
| 4 | 12 | 1 | 1 | 3 | 7 | 2 |
| 5 | 3 | 9 | 2 | 8 | 2 | 2 |
| 6 | 9 | 3 | 2 | 9 | 1 | 2 |
| 7 | 10 | 2 | 2 | 5 | 5 | – |
| 8 | 11 | 1 | 2 | – | – | – |
| 9 | 6 | 6 | 2 | – | – | – |

FIG.7

| SENSING SUBFRAME CONFIG. | NORMAL CYCLIC PREFIX IN DOWNLINK | | | EXTENDED CYCLIC PREFIX IN DOWNLINK | | |
|---|---|---|---|---|---|---|
| | DwPTS | GP | UpPTS | DwPTS | GP | UpPTS |
| 0 | 3 | 1 | 10 | 1 | 2 | 9 |
| 1 | 9 | 1 | 4 | 2 | 2 | 8 |
| 2 | 10 | 1 | 3 | 3 | 2 | 7 |
| 3 | 11 | 1 | 2 | 4 | 2 | 6 |
| 4 | 12 | 1 | 1 | 5 | 2 | 5 |
| 5 | 3 | 2 | 9 | 1 | 3 | 8 |
| 6 | 9 | 2 | 3 | 2 | 3 | 7 |
| 7 | 10 | 2 | 2 | 3 | 3 | 6 |
| 8 | 11 | 2 | 1 | 4 | 3 | 5 |
| 9 | 3 | 3 | 8 | 5 | 3 | 4 |

FIG.8

UE SENSING SUBFRAME CONFIGURATION

| CONFIG. | \multicolumn{10}{c}{SUBFRAME INDEX} | SENSING PATTERN | |
|---|---|---|---|---|---|---|---|---|---|---|---|---|

| CONFIG. | 0 | 1 | 2 | 3 | 4 | 5 | 6 | 7 | 8 | 9 | SENSING SUBFRAME | SENSING PERIOD (ms) |
|---|---|---|---|---|---|---|---|---|---|---|---|---|
| 0 | D | S | U | U | U | D | S | U | U | U | SENSING SUBFRAME / SPECIAL SUBFRAME | 10 |
| 1 | D | S | U | U | D | D | S | U | U | D | | |
| 2 | D | S | U | D | D | D | S | U | D | D | | |
| 3 | D | S | U | U | U | D | D | D | D | D | | |
| 4 | D | S | U | U | D | D | D | D | D | D | | |
| 5 | D | S | U | D | D | D | D | D | D | D | | |
| 6 | D | S | U | U | U | D | S | U | U | D | | |

SENSING PERIOD

SENSING SUBFRAME

SPECIAL SUBFRAME

FIG.9

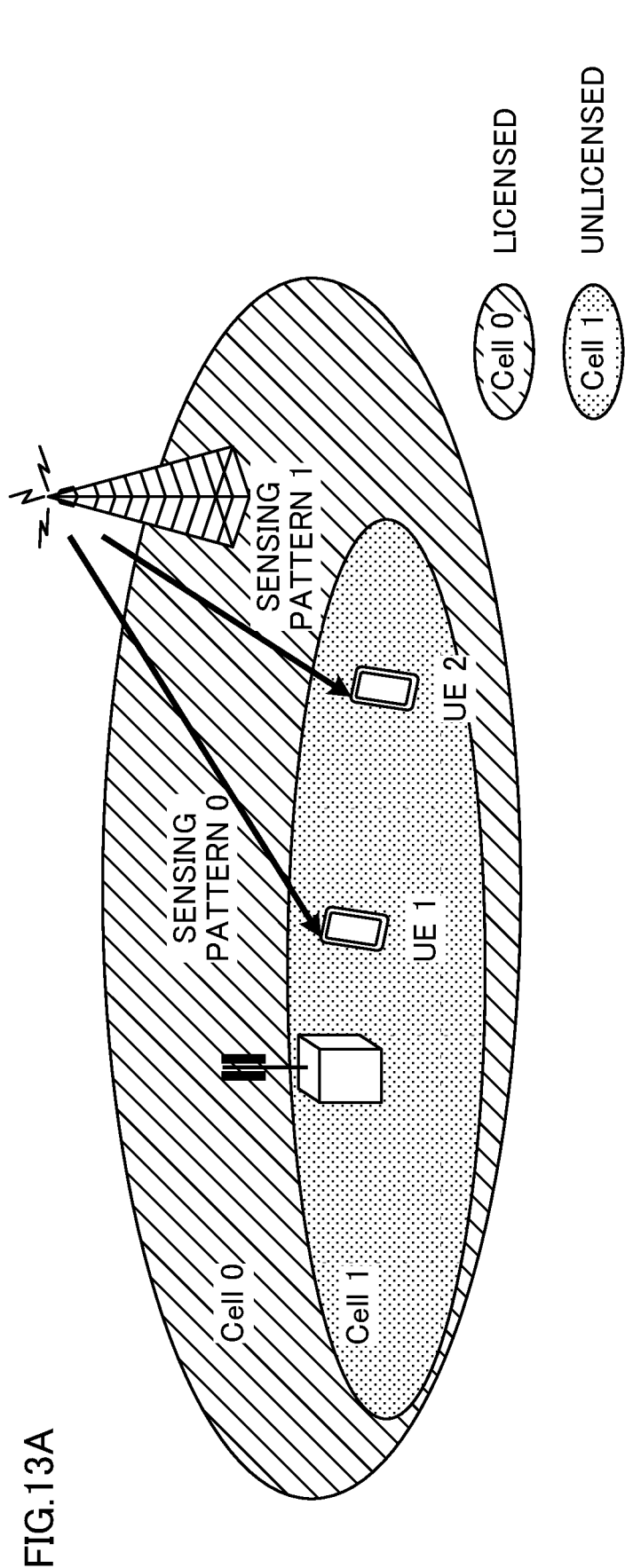

USER TERMINAL, RADIO BASE STATION, RADIO COMMUNICATION METHOD AND RADIO COMMUNICATION SYSTEM

CROSS-REFERENCE TO RELATED APPLICATIONS

This application is a continuation application of U.S. application Ser. No. 15/500,635, filed on Jan. 31, 2017, which is a national phase application of PCT/JP2015/068990, filed on Jul. 1, 2015, which claims priority to Japanese Patent Application No. 2014-156209, filed on Jul. 31, 2014. The contents of these applications are hereby incorporated by reference in their entirety.

TECHNICAL FIELD

The present invention relates to a user terminal, a radio base station, a radio communication method and a radio communication system that are applicable to next-generation communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). In LTE, as multiple-access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink). Also, successor systems of LTE (also referred to as, for example, "LTE-advanced" or "LTE enhancement" (hereinafter referred to as "LTE-A")) have been developed for the purpose of achieving further broadbandization and increased speed beyond LTE, and the specifications thereof have been drafted (Rel. 10/11).

In relationship to LTE-A systems, a HetNet (Heterogeneous Network), in which small cells (for example, pico cells, femto cells and so on), each having local a coverage area of a radius of approximately several tens of meters, are formed within a macro cell having a wide coverage area of a radius of approximately several kilometers, is under study. Also, in relationship to HetNets, a study is in progress to use carriers of different frequency bands between macro cells (macro base stations) and small cells (small base stations), in addition to carriers of the same frequency band.

Furthermore, in relationship to future radio communication systems (Rel. 12 and later versions), a system ("LTE-U" (LTE Unlicensed)) to run an LTE system not only in frequency bands that are licensed to communications providers (operators) (licensed bands), but also in frequency bands that do not require license (unlicensed bands), is under study. In LTE-U operations, a mode that is premised upon coordination with licensed band LTE is referred to as "LAA" (Licensed-Assisted Access) or "LAA-LTE. Note that systems that run LTE/LTE-A in unlicensed bands may be collectively referred to as "LAA," "LTE-U," "U-LTE," and so on.

While a licensed band refers to a band in which a specific operator is allowed exclusive use, an unlicensed band (also referred to as "non-licensed band") refers to a band which is not limited to a specific provider and in which radio stations can be provided. Unlicensed bands include, for example, the 2.4 GHz band and the 5 GHz band where Wi-Fi (registered trademark) and Bluetooth (registered trademark) can be used, the 60 GHz band where millimeter-wave radars can be used, and so on. Studies are in progress to use such unlicensed bands in small cells.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Existing LTE presumes operations in licensed bands, and therefore each operator is allocated a different frequency band. However, unlike a licensed band, an unlicensed band is not limited to use by a specific provider. Furthermore, unlike a licensed band, an unlicensed band is not limited to use in a specific radio system (for example, LTE, Wi-Fi, etc.). Consequently, there is a possibility that the frequency band which a given operator uses in LAA overlaps the frequency band which another operator uses in LAA and/or Wi-Fi.

When an LTE/LTE-A system (LTE-U) is run in an unlicensed band, different operators and/or non-operators may set up radio access points (also referred to as "APs," "TPs," etc.) and/or radio base stations (eNBs) without even coordinating and/or cooperating with each other. In this case, detailed cell planning is not possible, and, furthermore, interference control is not possible, and therefore significant cross-interference might be produced in the unlicensed band, unlike a licensed band.

In order to prevent cross-interference in unlicensed bands, a study is in progress to allow an LTE-U base station/user terminal to perform "listening" before transmitting signals and check whether other base stations/user terminals are engaged in communication. This listening operation is also referred to as "LBT" (Listen Before Talk).

There is a demand to introduce LBT functions for UL (UL-LBT) in user terminals in order to prevent interference with UL signals (uplink signals) in LAA systems. However, UL-LBT has never been studied heretofore, and no frame configuration that is suitable for UL-LBT has been proposed so far. In particular, unless the subframes for carrying out LBT sensing and/or the time length of sensing are configured adequately, it may not be possible to prevent producing interference with UL signals.

The present invention has been made in view of the above, and it is therefore an object of the present invention to provide a user terminal, a radio base station, a radio communication method and a radio communication system which can prevent producing interference with UL signals even when user terminals use LBT in systems that run LTE/LTE-A in unlicensed bands.

Solution to Problem

According to one aspect of the present invention, a user terminal can communicate with a radio base station by using an unlicensed band, and this user terminal has a receiving process section that detects a channel state in the unlicensed band by performing LBT (Listen Before Talk) in a sensing subframe, and a control section that controls a predetermined subframe as the sensing subframe based on a sensing pattern.

Advantageous Effects of Invention

According to the present invention, it is possible to prevent producing interference with UL signals even when user terminals use LBT in systems that run LTE/LTE-A in unlicensed bands.

BRIEF DESCRIPTION OF DRAWINGS

FIGS. 1A, 1B, and 1C provide diagrams to show examples of modes of radio communication systems that use LTE in unlicensed bands;

FIG. 7 is a diagram to show examples of special subframe configurations in TDD;

FIG. 8 is a diagram to show examples of sensing subframe configurations in TDD;

FIG. 9 is a diagram to show examples of associations of TDD UL/DL configurations and sensing patterns;

FIGS. 13A and 13B provide diagrams to show examples where user terminal-specific sensing patterns are reported explicitly;

DESCRIPTION OF EMBODIMENTS

Figure 2:
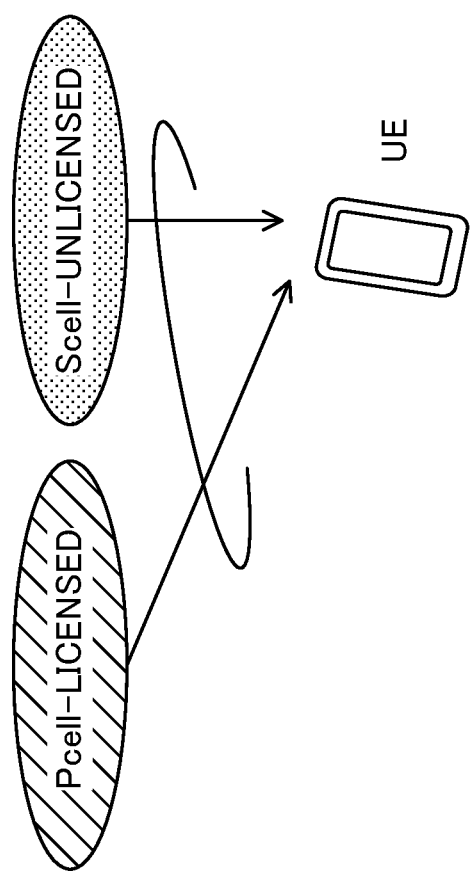
FIG. 2 is a diagram to show an example of a mode of a radio communication system that uses LTE in an unlicensed band.

FIGS. 1A, 1B, and 1C show examples of operation modes in a radio communication system (LTE-U) in which LTE is run in unlicensed bands. As shown in FIG. 1, a plurality of scenarios such as carrier aggregation (CA), dual connectivity (DC) and stand-alone (SA) are possible scenarios to use LTE in unlicensed bands.

FIG. 1A shows a scenario to employ carrier aggregation (CA) by using licensed bands and unlicensed bands. CA is a technique to bundle a plurality of frequency blocks (also referred to as "component carriers" (CCs), "cells," etc.) into a wide band. Each CC has, for example, a maximum 20 MHz bandwidth, so that, when maximum five CCs are bundled, a wide band of maximum 100 MHz is provided.

With the example shown in FIG. 1A, a case is illustrated in which a macro cell and/or a small cell to use licensed bands and small cells to use unlicensed bands employ CA. When CA is employed, one radio base station's scheduler controls the scheduling of a plurality of CCs. Based on this, CA may be referred to as "intra-base station CA" (intra-eNB CA) as well.

In this case, the small cells to use unlicensed bands may use a carrier that is used for DL communication only (scenario 1A) or use a TDD carrier (scenario 1B). The carrier to use for DL communication only is also referred to as a "supplemental downlink" (SDL). Note that FDD and/or TDD can be used in licensed bands.

Furthermore, a (co-located) structure may be employed here in which a licensed band and an unlicensed band are transmitted and received via one transmitting/receiving point (for example, a radio base station). In this case, the transmitting/receiving point (for example, an LTE/LTE-U base station) can communicate with a user terminal by using both the licensed band and the unlicensed band. Alternatively, it is equally possible to employ a (non-co-located) structure in which a licensed band and an unlicensed band are transmitted and received via different transmitting/receiving points (for example, one via a radio base station and the other one via an RRH (Remote Radio Head) that is connected with the radio base station).

FIG. 1B show a scenario to employ dual connectivity (DC) by using a licensed band and an unlicensed band. DC is the same as CA in bundling a plurality of CCs (or cells) into a wide band. While CA is based on the premise that CCs (or cells) are connected via ideal backhaul and is capable of coordinated control, which produces very little delay time, DC presumes cases in which cells are connected via non-ideal backhaul, which produces delay time that is more than negligible.

Consequently, in DC, cells are run by separate base stations, and user terminals communicate by connecting with cells (or CCs) of varying frequencies that are run under different base stations. So, when DC is employed, a plurality of schedulers are provided individually, and these multiple schedulers each control the scheduling of one or more cells (CCs) managed thereunder. Based on this, DC may be referred to as "inter-base station CA" (inter-eNB CA). Note that, in DC, carrier aggregation (intra-eNB CA) may be employed per individual scheduler (that is, base station) that is provided.

The example shown in FIG. 1B illustrates a case where a macro cell to use a licensed band and small cells to use unlicensed bands employ DC. In this case, the small cells to use unlicensed bands may use a carrier that is used for DL communication only (scenario 2A), or use a TDD carrier (scenario 2B). Note that the macro cell to use a licensed band can use FDD and/or TDD.

In the example shown in FIG. 1C, stand-alone (SA) is employed, in which a cell to run LTE by using an unlicensed band operates alone. Stand-alone here means that communication with terminals is possible without employing CA or DC. In this case, the unlicensed band can be run in a TDD carrier (scenario 3).

FIG. 2 shows an example of an operation mode in a radio communication system (LTE-U) in which LTE is run in an unlicensed band. In the operation modes of CA and DC shown in FIG. 1A and FIG. 1B, for example, as shown in FIG. 2, it is possible to use a licensed band CC (macro cell) as a primary cell (PCell) and use an unlicensed band CC (small cell) as a secondary cell (SCell). Here, the primary cell (PCell) refers to the cell that manages RRC connection, handover and so on when CA/DC is used, and is also a cell that requires UL communication such as data and feedback signals from user terminals. The primary cell is always configured in the uplink and the downlink. A secondary cell (SCell) is another cell that is configured in addition to the primary cell when CA/DC is employed. Secondary cells may be configured in the downlink alone, or may be configured in both the uplink and the downlink at the same time.

Note that, as shown in above FIG. 1A (CA) and FIG. 1B (DC), a mode to presume the presence of licensed-band LTE (licensed LTE) when running LTE-U is referred to as "LAA" (Licensed-Assisted Access) or "LAA-LTE. Note that systems that run LTE/LTE-A in unlicensed bands may be collectively referred to as "LAA," "LTE-U," "U-LTE" and so on.

In LAA, licensed band LTE and unlicensed band LTE are coordinated so as to allow communication with user terminals. LAA may assume a structure, in which a transmission point to use a licensed band (for example, a radio base station) and a transmission point to use an unlicensed band, when being a distance apart, are connected via a backhaul link (for example, optical fiber, the X2 interface and so on).

Now, existing LTE presumes operations in licensed bands, and therefore each operator is allocated a different frequency band. However, unlike a licensed band, an unlicensed band is not limited to use by a specific provider. Consequently, there is a possibility that the frequency band which a given operator uses in LTE-U overlaps the frequency band which another operator uses in an LAA system, a Wi-Fi system and so on.

When run in an unlicensed band, LTE may be carried out without even synchronization, coordination and/or cooperation between different operators and/or non-operators. In this case, a plurality of operators and/or systems share and use the same frequency in the unlicensed band, and therefore there is a threat of producing cross-interference.

So, in a Wi-Fi system that runs in an unlicensed band, resource allocation is carried out so that, in a given period, all bands are used for a specific user. Consequently, in Wi-Fi, in order to prevent transmitting signals from colliding each other between user terminals, access points and so on, carrier sense multiple access/collision avoidance (CSMA/CA), which is based on the mechanism of LBT (Listen Before Talk), is employed. To be more specific, for example, each transmission point (TP), access point (AP), Wi-Fi terminal (STA: Station) and so on perform "listening" (CCA: Clear Channel Assessment) before carrying out transmission, and carries out transmission only when there is no signal beyond a predetermined level.

In view of the above, LBT is expected to be required even in LTE/LTE-A systems (for example, an LAA system) to be run in unlicensed bands. By introducing LBT in LAA systems, it becomes possible to prevent interference between LAA and Wi-Fi. Also, it is possible to prevent interference between LAA systems. Even when user terminals that can be connected are controlled independently for every operator that runs an LAA system, it is possible to reduce interference without learning the details of the control for each operator, by means of LBT.

In LTE-systems to use LBT, an LTE-U base station and/or a user terminal perform listening (LBT) before transmitting signals in an unlicensed band cell, and, if no signal from other systems (for example, Wi-Fi) and/or other LAA transmission points is detected, the LTE-U base station and/or the user terminal communicate in the unlicensed band. For example, if received power that is equal to or lower than a predetermined threshold is measured in LBT, the LTE-U base station and/or the user terminal judge that the channel is in an idle state (LBT_idle) and carriers out transmission. When a "channel is in an idle state," this means that, in other words, the channel is not occupied by a certain system, and it is equally possible to say that the channel is clear, the channel is free and so on.

On the other hand, if, as a result of listening, signals from other systems and/or other LAA transmission points are detected, processes such as (1) making a transition to another carrier by way of DFS (Dynamic Frequency Selection), (2) applying transmission power control (TPC), or (3) holding (stopping) transmission may be carried out. For example, when the received power that is measured in LBT exceeds a predetermined threshold, the LTE-U base station and/or the user terminal judge that the channel is in a busy state (LBT_busy) and do not carry out transmission. In the event of LBT_busy, this channel becomes available for use after a predetermined backoff time is over. Note that the method of judging whether a channel is in an idle state/busy state based on LBT is by no means limited to this.

Figure 3B:
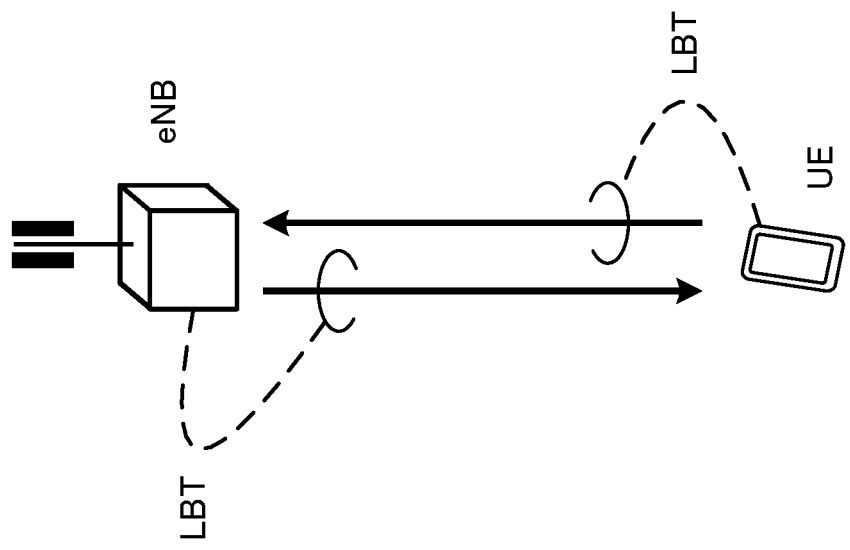
FIGS. 3A and 3B provide diagrams to explain examples of operating agents in LBT in a system in which LTE/LTE-A is run in an unlicensed band.
Figure 3A:
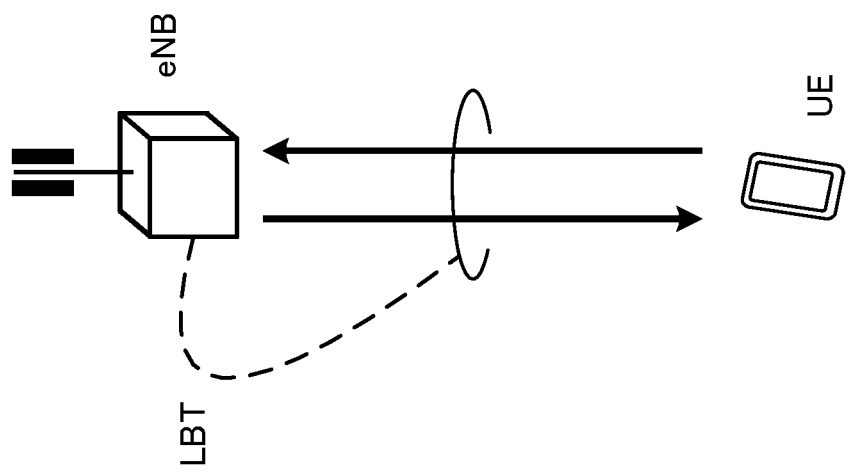

FIG. 3 provide diagrams to show operating agents in LBT in a system in which LTE/LTE-A is run in an unlicensed band. In FIG. 3, a radio base station (eNB) to form an unlicensed band cell, a user terminal (UE), and the downlink (DL)/uplink (UL) between these are shown. In the unlicensed band cell, listening (LBT) is carried out before a signal is transmitted, to check whether transmission points of other systems (for example, Wi-Fi) or other LAA (LTE-U) transmission points are engaged in communication. FIG. 3A shows an example in which the eNB carries out LBT with respect to both DL and UL. In this case, after the eNB judges that the channel is in the clear state based on LBT, the eNB reports a predetermined signal (for example, a UL grant) to the UE, so that the UE can carry out UL transmission. On the other hand, FIG. 3B shows an example of carrying out LBT on the transmitting side. In this case, LBT is carried out by the eNB in the event of DL transmission and by the UE in the event of UL transmission. Here, the LBT which the user terminal performs with respect to UL may be referred to as "UL-LBT."

The general idea of UL-LBT is that the state of unlicensed band interference in the user terminal can be learned adequately. However, no frame configuration that is suitable for UL-LBT has been proposed so far. In particular, unless the subframes for carrying out LBT sensing and/or the time of length of sensing are configured adequately, it may not be possible to adequately prevent producing interference with UL signals.

So, the present inventors have come up with the idea of providing adequate LBT-based sensing configurations (sensing patterns) for when user terminals carry out LBT in a system that runs LTE/LTE-A in an unlicensed band. To be more specific, the present inventors have come up with the idea of carrying out LBT by using predetermined subframes as sensing subframes based on the sensing patterns. Furthermore, the present inventors have come up with the idea of adequately configuring the length of each period (LBT-executing period, and/or others) included in sensing subframes.

According to the present invention, the subframes to carry out LBT sensing and/or the time length of sensing can be configured adequately, so that it is possible to prevent producing interference with UL signals in an LTE system in an unlicensed band.

Now, embodiments of the present invention will be described below in detail with reference to the accompanying drawings. Note that, although examples will be illustrated with the following description where LBT is used in an LTE-U operation mode (LAA) to presume the presence of licensed bands, the embodiments are by no means limited to this. Also, although structures will be presumed in which user terminals carry out LBT and radio base stations do not carry out LBT, the radio base stations may be capable of carrying out LBT as well.

Figure 4:
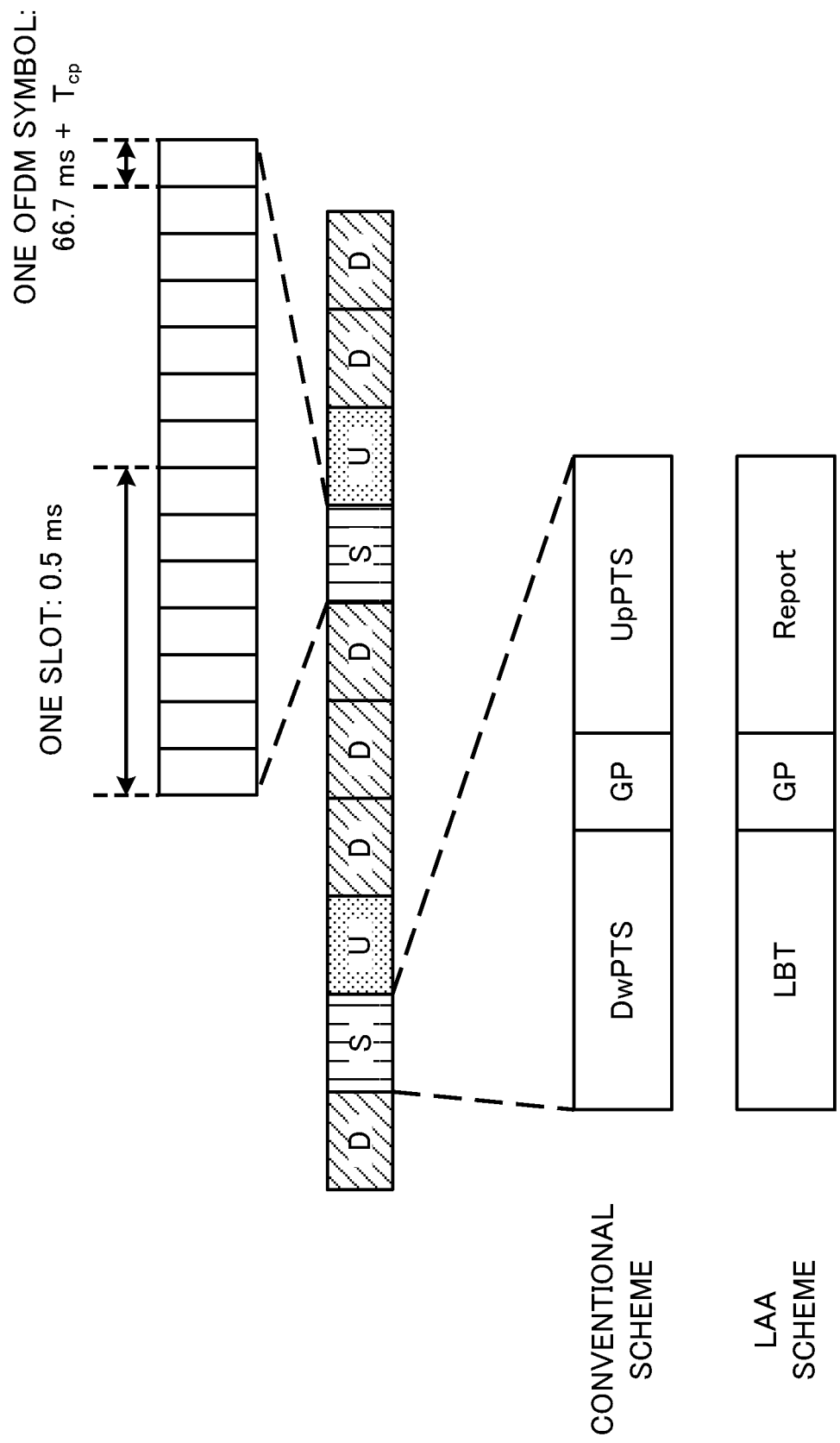
FIG. 4 is a diagram to show examples of frame configurations for LBT in a system in which LTE/LTE-A is run in an unlicensed band.

FIG. 4 is a diagram to show examples of frame configurations for LBT in a system in which LTE/LTE-A is run in an unlicensed band. One subframe (1 ms) is comprised of two slots, and one slot is equivalent to 0.5 ms. Also, one slot is comprised of seven OFDM symbols (six symbols when an extended cyclic prefix is used), and one OFDM symbol is equivalent to 66.7 μs+Tcp (Tcp: cyclic prefix length).

Also, the letters assigned to each subframe represents the types of subframes, where "D" stands for downlink (DL) subframes, "U" stands for uplink (UL) subframes, and "S" stands for special subframes or subframes in which LBT-based sensing is carried out (also referred to as "sensing subframes"). Note that the subframe configuration shown in FIG. 4 (the order in which D, U and S are placed) is one example, and this is by no means limiting.

The special subframe according to conventional (Rel. 11) TDD UL/DL configurations is comprised of a DwPTS (Downlink Pilot Time Slot), a GP (Guard Period) and a UpPTS (Uplink Pilot Time Slot). On the other hand, the sensing subframe according to the present invention is comprised of an LBT (LBT period), a GP (Guard Period) and a Report (report period). That is, the sensing subframe configuration according to the present invention is similar to the conventional special subframe configuration, so that it is possible to reduce the cost of implementing user terminals.

The LBT period is used to allow a user terminal to detect channel states. To be more specific, the user terminal carries out listening (LBT) in the LBT period. Here, unlike special subframes, the user terminal does not have to try receiving and demodulating/decoding the PDSCH (Physical Downlink Shared Channel) in sensing subframes.

The GP is used as a guard period for allowing the user terminal to switch from listening to sending a report. Also, depending on the length of the GP, the serving cell's cell coverage radius is determined. To make the cell radius bigger, a relatively long GP is required. On the other hand, when the cell radius is small, a short GP suffices. That is, the GP is a guard period for switching between transmission and reception.

The report period is a period to transmit feedback information for carrying out transmission in UL subframes following sensing subframes. The feedback information is used to allow the user terminal to transmit the PUSCH and radio base stations to receive this PUSCH. That is, this is useful information in PUSCH transmission. Candidates of this useful information include, for example, a scheduling request (SR)/random access preamble (RAP) and so on. With these, it becomes possible to request UL grants and transmit data after sensing. Also, other candidates of useful information include parameters related to the demodulation of the PUSCH, such as resource blocks (RBs), MCS (Modulation and Coding Scheme), and so on. By using these, it is possible to carry out data transmission after sensing without using UL grants.

Figure 5:
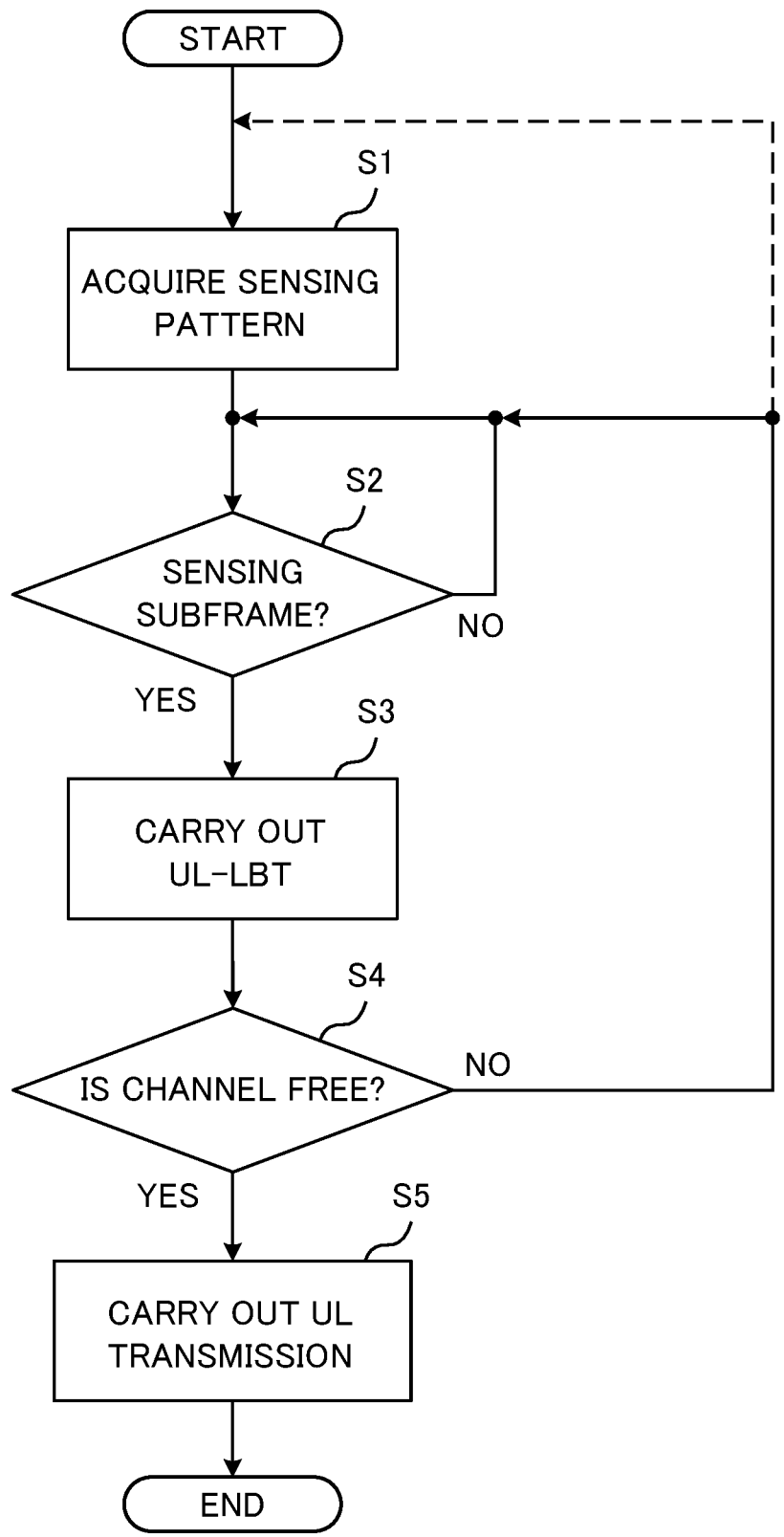
FIG. 5 is a flowchart to show an example of UL-LBT processes in a user terminal according to the present invention.

FIG. 5 is a flowchart to show an example of UL-LBT processes in a user terminal according to the present invention. First, a user terminal acquires the sensing pattern (step S1). As will be described later, the user terminal acquires the sensing pattern via an implicit or explicit report, or calculates and acquires the sensing pattern based on predetermined rules.

Here, the sensing pattern refers to information about the configuration of LBT-based sensing. In other words, the sensing pattern is information about the timing in which the user terminal performs LBT. The sensing pattern is, for example, formed by combining sensing subframes and the cycle of performing sensing (the cycle of sensing subframes, also referred to as the "sensing period"). The sensing pattern may be expressed as: (the subframes to be sensing subframes, the sensing period). For example, the sensing pattern when sensing is performed in arbitrary subframes every 1 ms may be expressed as: (Arbitrary subframes, 1 ms). Note that the sensing pattern is by no means limited to the above format.

The user terminal judges whether or not the current subframe is a sensing subframe based on the sensing pattern (step S2). When the current subframe is not a sensing subframe (step S2: NO), the user terminal carries out step S2 again in the next subframe.

When the current subframe is a sensing subframe (step S2: YES), the user terminal executes UL-LBT (step S3). Then, based on the result of UL-LBT, the user terminal judges whether or not the channel is free (step S4). When judging that the channel not free (step S4: NO), the user terminal carries out step S2 again in the next subframe. Note that, when the sensing pattern is calculated in the user terminal in step S1 and the channel is judged not free, the user terminal may carry out step S1 again (the chained line in FIG. 5).

When judging that the channel is free (step S4: YES), the user terminal carries out UL transmission in the following UL subframe (step S5).

The present invention primarily relates to steps S1 to S3 in FIG. 5. In particular, the method of acquiring the sensing pattern in step S1 will be described in detail with reference to a first and a second embodiment.

First Embodiment

According to the first embodiment, sensing patterns are associated with TDD UL/DL configurations. In other words, the first embodiment is applicable to cases where an unlicensed band to perform LBT is a TDD carrier.

Figure 6:
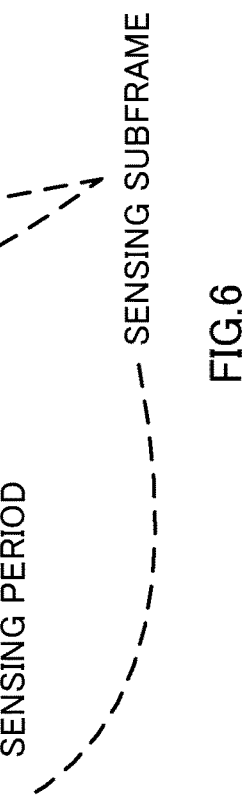
FIG. 6 is a diagram to show examples of associations of TDD UL/DL configurations and sensing patterns.

FIG. 6 is a diagram to show examples of associations of TDD UL/DL configurations and sensing patterns. In FIG. 6, "Config." indicates TDD UL/DL configurations, and "Subframe index" indicates the types of subframes corresponding to the UL/DL configurations. Here, "D" stands for downlink (DL) subframes, "U" stands for uplink (UL) subframes and "S" stands for special subframes or sensing subframes.

In the example of FIG. 6, the special subframes are all used as sensing subframes. The special subframe can be seen as DL subframes, so that, in other words, in FIG. 6, the DL subframes that neighbor (that immediately precede) UL subframes are configured as sensing subframes. Consequently, in UL/DL configurations {0, 1, 2, 6}, the sensing period is 5 ms, and, in UL/DL configurations 3 to 5, the sensing period is 10 ms. Also, in UL/DL configurations 0 to 6, the number of UL subframes that follow after the sensing subframes is one to three, so that the channel-occupying time to be determined based on LBT results is 1 to 3 ms.

A radio base station reports the sensing pattern to a user terminal by using higher layer signaling (for example, RRC signaling), broadcast information (for example, SIB 1) and so on. The sensing pattern may be reported with the UL/DL configuration, or, if the sensing pattern is associated with a UL/DL configuration in advance, the UL/DL configuration may be reported so as to report the sensing pattern implicitly. For example, in the event of Config. 2, (Special subframes, 5 ms) may be reported explicitly as the sensing pattern, or, when Config. 2 is reported as the UL/DL configuration, the user terminal may interpret this as an implicit report of (Special subframes, 5 ms). Note that for the UL/DL configurations, configurations that are different from UL/DL configurations 0 to 6 shown in FIG. 6 may be used, and, in that case, the DL subframes that neighbor (that immediately precede) UL subframes may be made sensing subframes.

Next, methods of configuring the length of each period (LBT, GP and Report) included in sensing subframes will be described. In method 1, conventional (LTE Rel. 11) special subframe configurations are re-used as sensing subframe configurations. To be more specific, according to method 1, the lengths of DwPTS, GP and UpPTS in special subframes are used as the lengths of LBT, GP and Report in sensing subframes, respectively.

FIG. 7 is a diagram to show examples of special subframe configurations in TDD. "Special subframe config." indicates special subframe configurations. Also, the lengths of DwPTS, GP and UpPTS are given in symbol units. For example, when special subframe configuration 0 is selected as the sensing subframe configuration, the lengths of LBT, GP and Report in sensing subframes are three, ten and one OFDM symbol, respectively. Note that the special subframe configurations are not limited to configurations 0 to 9 shown in FIG. 7.

Each special subframe configuration determines the lengths of DwPTS, GP and UpPTS. Also, each configuration is provided for the case where the normal cyclic prefix is used (the symbol duration of one subframe is 14), and the case where an extended cyclic prefix is used (the symbol duration of one subframe is 12). Note that each configuration has only to define at least two parameters, and one parameter may be removed. For example, if only DwPTS and UpPTS are defined, GP does not have to be defined. In this case, the user terminal can judge the length of GP based on the symbol duration, DwPTS and UpPTS.

Note that, from the perspective of improving the accuracy of LBT sensing, it is preferable to make the time of GP shorter—to be more specific, three symbols or shorter. That is, it is preferable to select sensing subframe configurations from the special subframe configurations of {2, 3, 4, 6, 7, 8} (when the normal cyclic prefix is used) or {1, 2, 3, 5, 6} (when an extended cyclic prefix is used).

In method 2, new sensing subframe configurations are defined. According to method 2, the lengths of LBT, GP and Report in sensing subframes can be configured without relying upon the lengths of DwPTS, GP and UpPTS in special subframes, respectively.

FIG. 8 is a diagram to show examples of sensing subframe configuration in TDD. "Sensing subframe config." indicates sensing subframe configurations. Also, the lengths of DwPTS, GP and UpPTS are given in symbol units. Note that the sensing subframe configurations are not limited to configurations 0 to 9 shown in FIG. 8. Also, the sensing subframe configurations may use different lengths of LBTs, GPs and Reports from those shown in FIG. 8.

As clear from the comparison of FIG. 8 and FIG. 7, it is preferable to structure the sensing subframe configurations to include many GPs of smaller values than the GPs in conventional (Rel. 11) special subframe configurations. By this means, it becomes possible to configure guard periods that are more suitable for small cells having relatively small coverage radii.

Also, as clear from the comparison of FIG. 8 and FIG. 7, it is preferable to structure the sensing subframe configurations to include many Reports of greater values than the UpPTSs in conventional (Rel. 11) special subframe configurations. By this means, the report period is extended, and it becomes possible to transmit many pieces of useful information (for example, NAV (Network Allocation Vector), BSR (Buffer Status Report), etc.). Also, when a plurality of different user terminals carry out transmissions in the report period in the same sensing subframe, it becomes possible to allocate different time/frequency/code resources between user terminals, so that the possibility of collisions of transmitting signals can be reduced.

Information about the sensing subframe configuration that is applied may be reported to the user terminal through higher layer signaling (for example, RRC signaling) and/or broadcast information (for example, SIB 1). Here, when a plurality of sensing subframes are present in a radio frame, each sensing subframe may use a different sensing subframe configuration. Also, in the event of above method 1, the special subframe configuration and the sensing subframe configuration to be applied to a radio frame may be selected to be different.

Note that, although FIG. 6 shows an example in which all the special subframes are used as sensing subframes, this is by no means limiting. For example, a structure may be used in which, when a plurality of special subframes are present in a radio frame, part of the special subframes is used as sensing subframes. In this structure, the special subframes that are not used as sensing subframes can be used as DL subframes, so that it is possible to maintain a relatively short sensing period (for example, ten subframes or shorter), and, furthermore, reduce the decrease of DL throughput.

FIG. 9 is a diagram to show examples of associations of TDD UL/DL configurations and sensing patterns. Unlike the examples of FIG. 6, in the examples of FIG. 9, in UL/DL configurations {0, 1, 2, 6}, in which a plurality of special subframes are included in one frame, the special subframe of subframe 1 is made a sensing subframe, and the special subframe of subframe 6 is used as a special subframe on an as-is basis. Consequently, in UL/DL configurations 0 to 6, the sensing period is 10 ms.

Note that the allocation rule as to which special subframes are used as sensing subframes is by no means limited to this. For example, in the case of FIG. 9, it is possible to employ a structure in which, in UL/DL configurations {0, 1, 2, 6}, the special subframe of subframe 6 is used as a sensing subframe, and the special subframe of subframe 1 is used as a special subframes on an as-is basis. Also, it is possible to employ a structure to use different special subframes as sensing subframes on a per radio frame basis.

Also, it is possible to use a structure in which the sensing period is longer than ten subframes, and in which a radio frame including no sensing subframes is present. For example, the sensing period may be made 20 ms, 40 ms and 80 ms. According to this structure, it is possible to use special subframes that are not used as sensing subframes as DL subframes, so that it is possible to maintain executing sensing in a predetermine period, and, furthermore, reduce the decrease of DL throughput even more. The sensing period may be reported to the user terminal via higher layer signaling (for example, RRC signaling) and/or broadcast information (for example, SIB 1).

Second Embodiment

With the second embodiment, the sensing patterns are not associated with TDD UL/DL configurations. In this case, the user terminal implicitly judges the sensing pattern to use, or uses sensing patterns that are reported explicitly.

When the user terminal judges the sensing pattern implicitly, the user terminal carries out sensing if predetermined conditions are fulfilled.

Figure 10A:
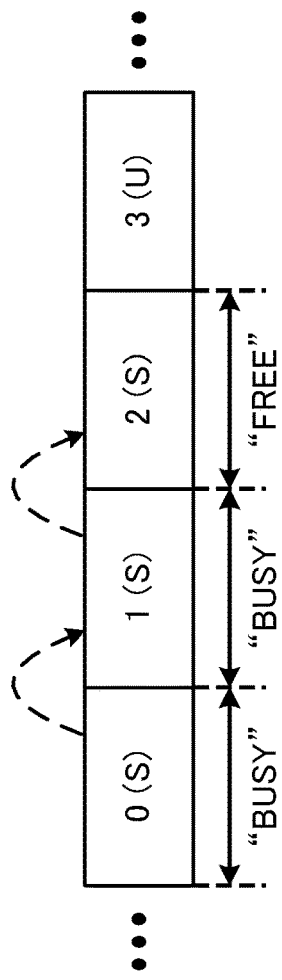
FIGS. 10A and 10B provide diagrams to show examples of sensing patterns to be configured implicitly.

In this case, the user terminal calculates the sensing pattern in accordance with predetermined rules. FIG. 10 provide diagrams to show examples of sensing patterns that are configured implicitly. For example, as shown in FIG. 10A, a structure may be employed, in which the sensing period is one subframe, and in which sensing is always carried out when there is data to transmit. In this case, the sensing pattern is (Arbitrary subframes, 1 ms). In the example of FIG. 10A, the sensing results in subframes 0 and 1 are "busy" and the result in subframe 2 is "free," so that the user terminal can execute transmission in, for example, subframe 3. In this way, although a structure to execute sensing on a per subframe basis makes the time to wait for sensing short and enables transmission with low delays, sensing is performed with high frequency, and this results in increased power consumption.

Also, when there is data to transmit, a structure may be employed in which the sensing period is changed depending on the number of times sensing is performed in order to transmit this data. For example, when the sensing result is "busy," the user terminal may change the sensing period by determining the next sensing subframe based on following table 1:

TABLE 1

| | Sensing period | Sensing period (ms) |
|---|---|---|
| i ≤ 5 | $(SF_{current} + 2^{5-i})$ mod 10 | $2^{5-i}$ |
| i > 5 | $(SF_{current} + 1)$ mod 10 | 1 |

Here, i is the number of times sensing is performed (the number of times to wait for transmission), and $SF_{current}$ is the current subframe.

Figure 10B:
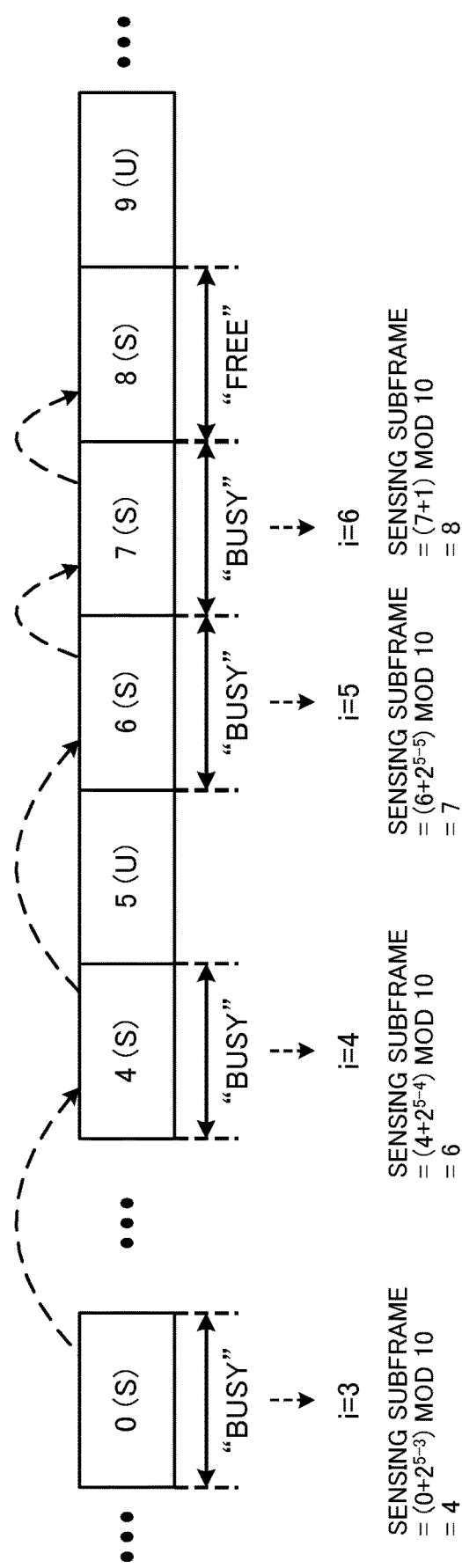

In the example of FIG. 10B, the result of sensing in subframe 0 is "busy," and, at this time, i=3 and $SF_{current}$=0. So, the user terminal determines the next sensing subframe= $(0+2^{5-3})$ mod10=4 based on table 1.

The result of sensing in subframe 4 is "busy," and, at this time, i=4 and $SF_{current}$=4. So, the user terminal determines the next sensing subframe= $(4+2^{5-4})$ mod10=6 based on table 1.

The result of sensing in subframe 6 is "busy," and, at this time, i=5 and $SF_{current}$=6. So, the user terminal determines the next sensing subframe= $(6+2^{5-5})$ mod10=7 based on table 1.

The result of sensing in subframe 7 is "busy," and, at this time, i=6 and $SF_{current}$=7. So, the user terminal determines the next sensing subframe=(7+1) mod10=8 based on table 1.

The result of sensing in subframe 8 is "free," so that the user terminal can start the transmission process. In this way, a structure to change the sensing period depending on the number of times to try sensing makes possible a trade-off between delay and power consumption.

Note that the implicit sensing patterns are not limited to these. For example, a structure may be employed here in which sensing is carried out for every several subframes, instead of carrying out sensing on a per subframe basis. Also, a structure may be employed in which the sensing period is made long depending the number of times of sensing.

Figure 11:
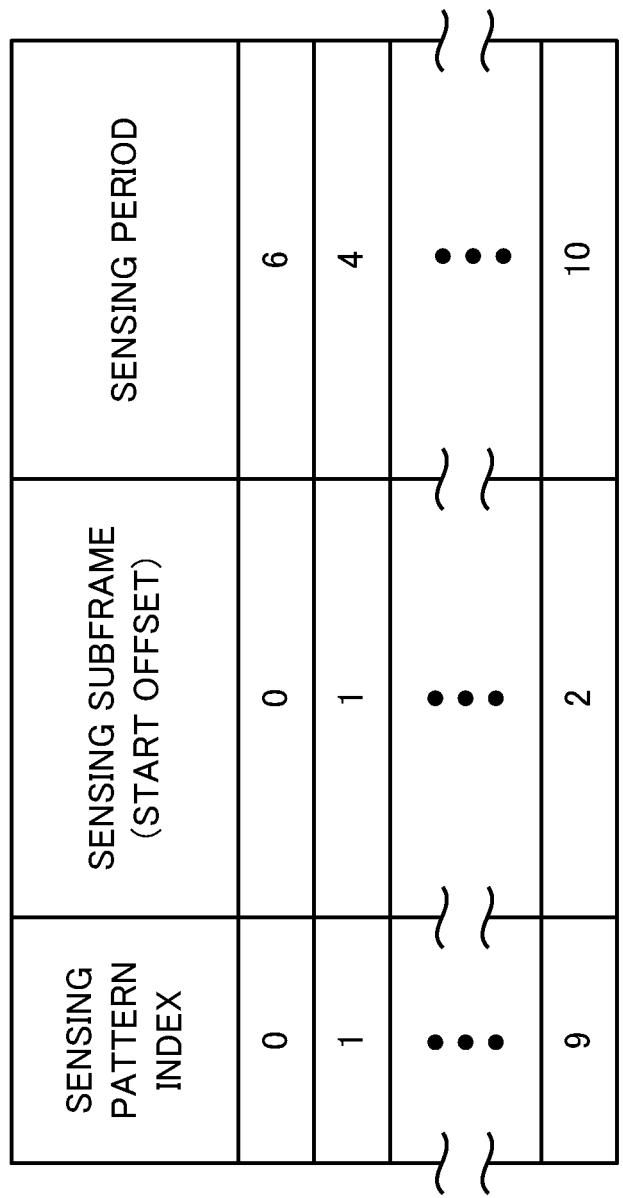
FIG. 11 is a diagram to show examples of sensing patterns to be reported explicitly.

Next, a case will be described in which the user terminal uses sensing patterns that are reported explicitly. FIG. 11 is a diagram to show examples of sensing patterns that are reported explicitly. "Sensing pattern index" indicates the indices of sensing patterns. FIG. 11 shows sensing patterns that presume periodic sensing, and one sensing pattern is associated with a sensing subframe start offset (that is, the index of the minimum sensing subframe in one frame) and a sensing period. For example, referring to FIG. 11, when the sensing pattern index is 0, the sensing subframe is 0, and the sensing period is 6.

The sensing patterns may be cell-specific. In this case, the radio base stations forming each cell report cell-specific sensing patterns to the user terminals in each cell by using broadcast information (for example, SIB 1). Also, the sensing patterns may be user terminal-specific. In this case, the radio base stations report user terminal-specific sensing patterns to the user terminals by using higher layer signaling (for example, RRC signaling).

Figures 12A, 12B:
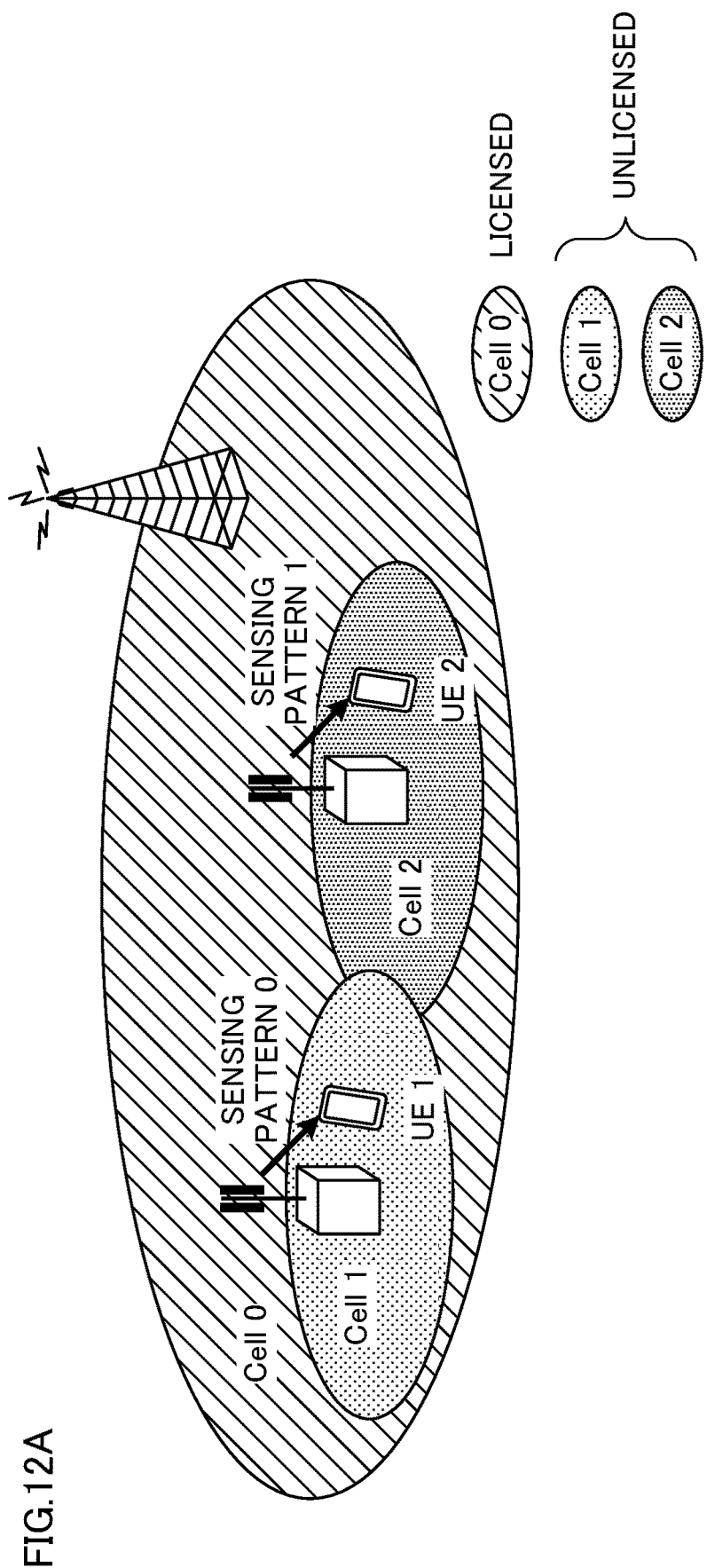
FIGS. 12A and 12B provide diagrams to show examples where cell-specific sensing patterns are reported explicitly.

FIG. 12 provide diagrams to show examples in which cell-specific sensing patterns are reported explicitly. In the example of FIG. 12, UE 1 is connected with unlicensed band cell 1, and UE 2 is connected with unlicensed band cell 2. Cell 1 reports sensing pattern 0 (see FIG. 11), which is the subject cell's sensing pattern, to UE 1, which is a serving user terminal, and cell 2 reports sensing pattern 1 (see FIG. 11), which is the subject cell's sensing pattern, to UE 2, which is a serving user terminal. Note that a structure may be employed here in which radio base stations (cells) report the sensing patterns used in the subject cells to each other, or a structure may be employed in which radio base stations select and use sensing patterns that are from those of other cells. By so doing, even when the coverage areas of a plurality of cells overlap, it is possible to prevent collisions of UL transmissions after LBT by using mutually varying sensing patterns.

FIG. 13 provide diagrams to show examples of cases where user terminal-specific sensing patterns are reported explicitly. In the example of FIG. 13, UE 1 and UE 2 are connected with licensed band cell 0 and unlicensed band cell 1. Cell 0 reports, to UE 1 and UE 2, which are serving user terminals, sensing patterns 0 and 1 (see FIG. 11), which are the sensing patterns of these. Note that it is equally possible to employ a structure to report user terminal-specific sensing patterns from the unlicensed band cell.

Note that it is equally possible to use a structure to directly report the start offset of sensing subframes, the sensing period and so on, instead of reporting sensing patterns. According to this structure, the user terminals are not limited to combinations that are determined based on sensing patterns, and are able to execute sensing adequately.

According to the second embodiment, the sensing subframe configurations may use configurations to include an LBT, a GP and a Report. In this case, the user terminal may, as has been described with the first embodiment, decide the length of each period in sensing subframes based on the special subframe configurations in TDD, newly defined sensing subframe configurations and so on. Also, the sensing subframe configurations of the second embodiment are by no means limited to configurations including an LBT, a GP and a Report. For example, it is possible to make the whole of a sensing subframe the LBT time.

The sensing subframe start offset, the sensing period and the sensing subframe configuration may be reported on a per cell basis, by using broadcast information (for example, SIB 1), or may be reported on a per user terminal basis by using higher layer signaling (for example, RRC signaling). It is preferable to report these on a per cell basis if the sensing patterns are cell-specific, or on a per user terminal basis if the sensing patterns are user terminal-specific.

Note that, according to the first and second embodiments, the sensing pattern, the sensing period, the LBT sensing time and so on are determined so as to fulfill predetermined LBT-related restrictions (for example, restrictions by the country, region and so on). To be more specific, the sensing time, the channel-occupying time and so on are determined so as to allow flexible and even use of bands with other systems that use unlicensed bands. For example, in Europe, the channel-occupying time is required to be within 1 ms at a minimum and 10 ms at a maximum.

Third Embodiment

Methods of configuring sensing subframes semi-statically have been described with the above first and second embodiments. Since these embodiments presume using sensing subframes in UL-LBT, for terminals that have little (or no) UL data, it is a waste to execute LBT in sensing subframes. In many cases, traffic tends to be concentrated in DL, and therefore, for example, using 20% of the resources for UL-LBT as shown with the structure of Config. 2 in FIG. 6 is a significant waste.

From this perspective, the present inventors have furthermore come up with the idea of switching sensing subframes in accordance with traffic. To be more specific, the present inventors have arrived at using sensing subframes as conventional special subframes when there is DL traffic and as sensing subframes when there is UL traffic. By this means, it becomes possible to use radio resources more effectively.

Figure 14:
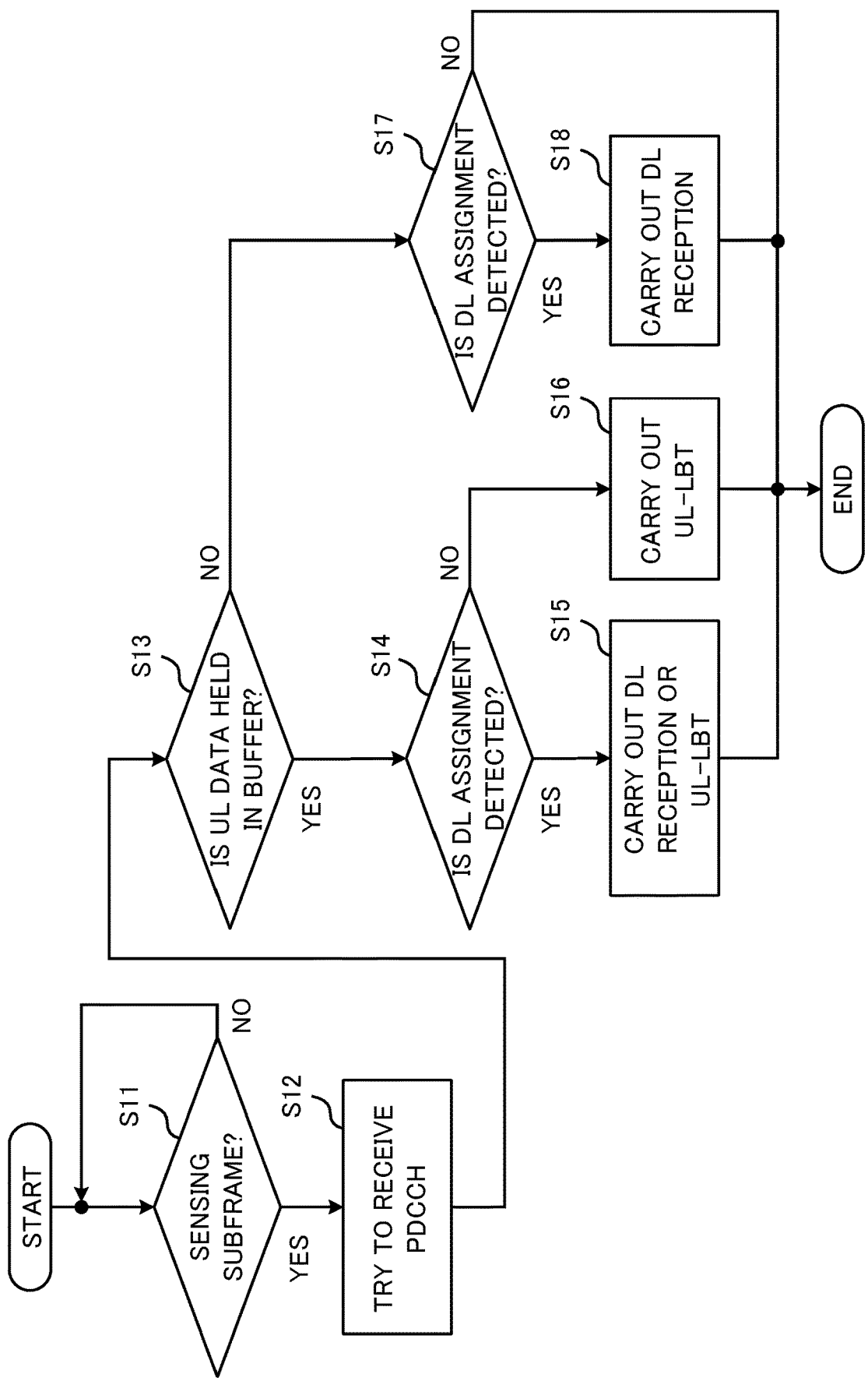
FIG. 14 is a flowchart to show an example of sensing subframe switching processes in a third embodiment.

According to a third embodiment of the present invention, whether to use each sensing subframe as a sensing subframe or as a special subframe is decided. FIG. 14 is a flowchart to show an example of sensing subframe switching processes in the third embodiment.

First, a user terminal judges whether or not the current subframe is a sensing subframe (step S11). If the current subframe is not a sensing subframe (step S11: NO), the user terminal waits until the next subframe, and carries out step S11 again.

If the current subframe is a sensing subframe (step S11: YES), the user terminal first reads the PCFICH (Physical Control Format Indicator Channel), and, based on the PCFICH, tries to receive the PDCCH (Physical Downlink Control Channel) in a predetermined OFDM symbol period (for example, in a period of one to two OFDM symbols) (step S12). Alternatively, in step S12, the user terminal may skip receiving the PCFICH, and try receiving the PDCCH in a predetermined OFDM symbol period (for example, in a period of one to two OFDM symbols) that is configured in advance by higher layer signaling (for example, RRC signaling and so on).

The user terminal judges whether or not UL data is held in the buffer (step S13). If the user terminal judges that UL data is held (step S13: YES), as a result of step S12, the user terminal further judges whether or not a DL assignment to designate the PDSCH for the subject terminal is detected (step S14). When judging that a DL assignment has been detected (step S14: YES), the user terminal performs one of the following (step S15):

(Alt. 1) the user terminal identifies the current subframe as a special subframe, pends UL-LBT (pending) and executes DL reception; and (Alt. 2) the user terminal identifies the current subframe a sensing subframe, gives up DL reception, and performs UL-LBT. Here, in DL reception, the user terminal receives and demodulates the PDSCH in the same way as with DwPTS in conventional special subframes. Note that, when the user terminal performs Alt. 2, it is preferable to use a structure to transmit NACK in a predetermined timing so as to let the radio base station know that the user terminal has given up DL reception.

In above Alt. 1, it is possible to transmit and receive DL, where the traffic tends to be heavy, so that it is possible to improve user throughput. Although UL, which tends to have light traffic, is pended, and the delays of UL grow, this is not particularly a problem because transmission can be carried out in future transmitting/receiving opportunities. In above-described Alt. 2, UL data to have greater delays than DL can be transmitted/received preferentially, so that it is possible to improve the speed the user experiences. Although DL reception fails in this subframe, this is not particularly a problem, because a DL assignment has been detected, so that, if only a NACK can be transmitted in a predetermined timing, a retransmission can be made in a future transmitting/receiving opportunity.

Meanwhile, if the user terminal judges that no DL assignment has been detected (step S14: NO), the user terminal identifies the current subframe as a sensing subframe, and executes UL-LBT (step S16).

Also, when the user terminal judges that no UL data is held (step S13: NO), the user terminal furthermore judges whether or not a DL assignment to designate the PDSCH for the subject terminal has been detected (step S17). When the user terminal judges that a DL assignment has been detected (step S17: YES), the user terminal identifies the current subframe as a special subframe, and executes DL reception (step S18).

Meanwhile, although a structure is used in the example of FIG. 14 in which the user terminal does nothing (does not carry out transmission, reception or sensing) when judging that no DL assignment has been detected (step S17: NO), this is by no means limiting. For example, the user terminal may identify the current subframe as a sensing subframe and execute UL-LBT.

Note that, in above step S15, it is possible to switch between and perform the operations of Alt. 1 and Alt. 2 depending on whether or not the UL data that is held in the buffer is control information. For example, when there is UL data that includes control information, the user terminal gives up DL reception and executes UL-LBT, and, otherwise, pends UL-LBT and prioritizes DL reception. By this means, the user terminal becomes capable of transmitting control information, which is important in communication, as quickly as possible. [0097] Also, it is equally possible to use a structure in which UL-LBT is carried out in above steps S15 and S16 if a UL grant to command a PUSCH transmission is detected upon the reception of the PDCCH in step S12.

Also, although, in accordance with the first and second embodiments, the above-described flow presumes a case where sensing subframes are configured in advance, this is by no means limiting. For example, it is equally possible to use a structure in which, when sensing subframes are not configured in advance, the user terminal judges whether or not the current subframe is a special subframe in step S11, and performs processes of step S12 and later steps when the current subframe is a special subframe.

As described above, according to the third embodiment, it is possible to use a predetermined subframe as a sensing subframe and/or as a special subframe depending on uplink/downlink traffic, so that radio resources can be used more flexibly. Also, by executing UE operations to try receiving control signals in the first several symbols of this subframe, a radio base station can transmit, to a user terminal, a DL assignment to command receiving the PDSCH in the event of a special subframe, or transmit a UL grant to command transmitting the PUSCH in the event of a sensing subframe.

(Structure of Radio Communication System)

Now, the structure of the radio communication system according to one embodiment of the present invention will be described below. In this radio communication system, the above-described radio communication methods according to the first to third examples are employed. Note that the above-described radio communication methods of the first to third examples may be applied individually or may be applied in combination.

Figure 15:
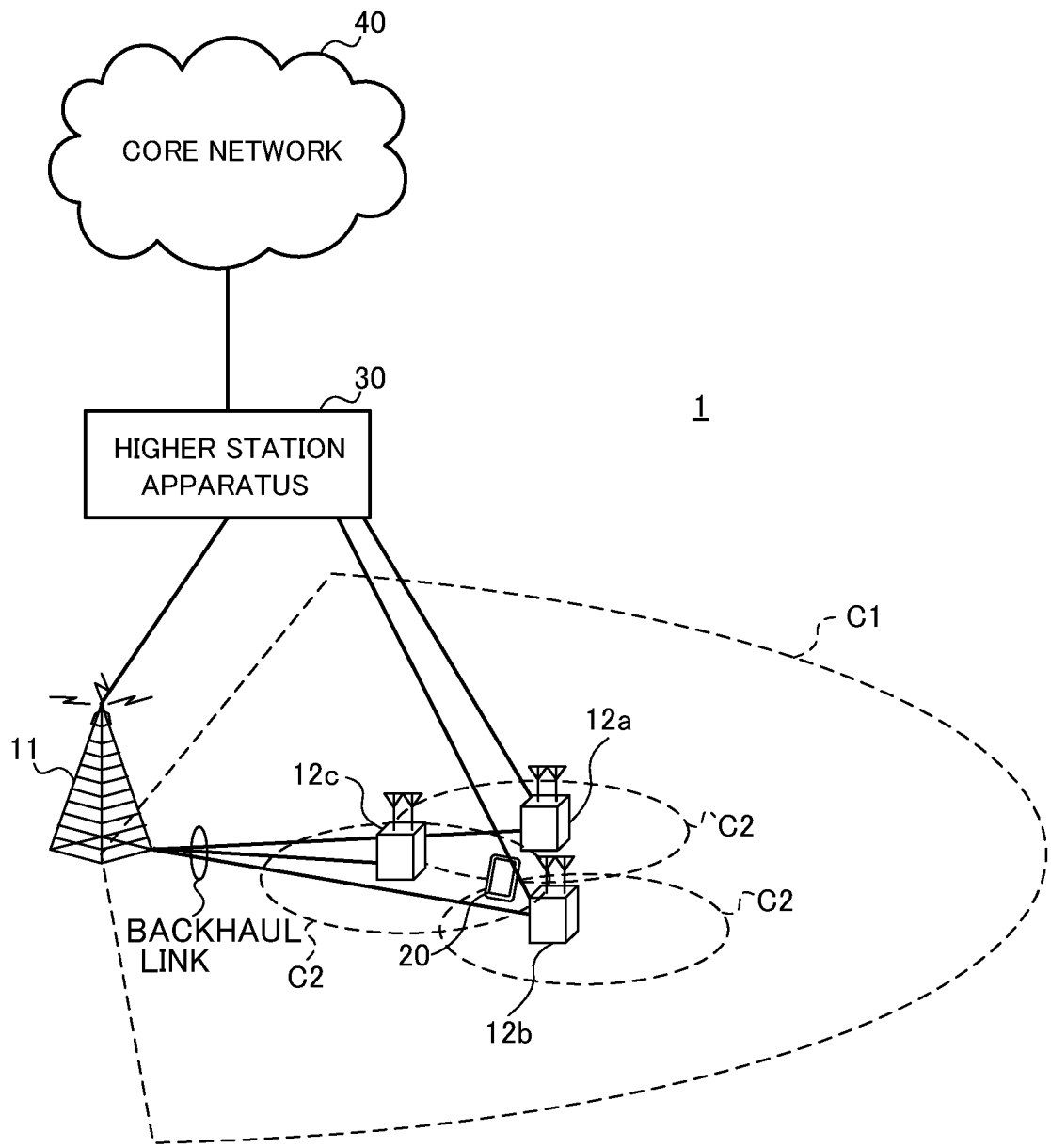
FIG. 15 is a diagram to show an example of a schematic structure of a radio communication system according to an embodiment of the present invention.

FIG. 15 is a diagram to show an example of a schematic structure of a radio communication system according to the present embodiment. Note that the radio communication system shown in FIG. 15 is a system to incorporate, for example, an LTE system, super 3G and LTE-A system. This radio communication system can adopt carrier aggregation (CA) and/or dual connectivity (DC) to group a plurality of fundamental frequency blocks (component carriers) into one, where the LTE system bandwidth constitutes one unit. Also, the radio communication system shown in FIG. 15 has a radio base station (for example, an LTE-U base station) that is capable of using unlicensed bands. Note that this radio communication system may be referred to as "IMT-Advanced," or may be referred to as "4G" or "FRA" (Future Radio Access).

The radio communication system 1 shown in FIG. 15 includes a radio base station 11 that forms a macro cell C1, and radio base stations 12a and 12b that form small cells C2, which are placed within the macro cell C1 and which are narrower than the macro cell C1. Also, the user terminals 20 are placed in the macro cell C1 and in each small cell C2. For example, a mode may be possible in which the macro cell C1 is used in a licensed band and the small cells C2 are used in unlicensed bands (LTE-U). Also, a mode may be also possible in which part of the small cells is used in a licensed band and the rest of the small cells are used in unlicensed bands.

The user terminals 20 can connect with both the radio base station 11 and the radio base stations 12. The user terminals 20 may use the macro cell C1 and the small cells C2, which use different frequencies, at the same time, by means of CA or DC. For example, it is possible to transmit assist information (for example, the DL signal configuration) related to a radio base station 12 (which is, for example, an LTE-U base station) that uses an unlicensed band, from the radio base station 11 to use a licensed band to the user terminals 20. Also, a structure may be employed here in which, when CA is used between a licensed band and an unlicensed band, one radio base station (for example, the radio base station 11) controls the scheduling of licensed band cells and unlicensed band cells.

Note that it is equally possible to use a structure in which the user terminals 20 connect with the radio base stations 12, instead of connecting with the radio base station 11. For example, it is possible to use a structure in which a radio base station 12 to use an unlicensed band connects with the user terminals 20 in stand-alone. In this case, the radio base station 12 controls the scheduling of unlicensed band cells.

Between the user terminals 20 and the radio base station 11, communication is carried out using a carrier of a relatively low frequency band (for example, 2 GHz) and a narrow bandwidth (referred to as, for example, "existing carrier," "legacy carrier" and so on). Meanwhile, between the user terminals 20 and the radio base stations 12, a carrier of a relatively high frequency band (for example, 3.5 GHz and so on) and a wide bandwidth may be used, or the same carrier as that used in the radio base station 11 may be used. Between the radio base station 11 and the radio base stations 12 (or between two radio base stations 12) wire connection (optical fiber, the X2 interface, etc.) or radio connection may be established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as a "radio base station 10," unless specified otherwise. The user terminals 20 are terminals to support various communication schemes such as LTE, LTE-A and so on, and may be either mobile communication terminals or stationary communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to mitigate interference between terminals by dividing the system band into bands formed with one or continuous resource blocks per terminal, and allowing a plurality of terminals to use mutually different bands. Note that the uplink and downlink radio access schemes are by no limited to combinations of these.

In the radio communication system 1, a downlink shared channel (PDSCH: Physical Downlink Shared CHannel), which is used by each user terminal 20 on a shared basis, a broadcast channel (PBCH: Physical Broadcast Channel) and downlink L1/L2 control channels are used as downlink channels. User data, higher layer control information and predetermined SIBs (System Information Blocks) are communicated in the PDSCH. Also, MIBs (Master Information Block) and so on are communicated in the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. By the PDCCH, downlink control information (DCI), including PDSCH and PUSCH scheduling information, and so on communicated. The number of OFDM symbols to use for the PDCCH is transmitted by the PCFICH. HARQ delivery acknowledgement signals (ACKs/NACKs) in response to the PUSCH are communicated by the PHICH. The EPDCCH is frequency-division-multiplexed with the PDSCH (downlink shared data channel), and may be used to communicate DCI, like the PDCCH.

Also, in the radio communication system 1, an uplink shared channel (PUSCH: Physical Uplink Shared Channel), which is used by each user terminal 20 on a shared basis, an uplink control channel (PUCCH: Physical Uplink Control Channel), a random access channel (PRACH: Physical Random Access Channel) and so on are used as uplink channels. User data and higher layer control information are communicated by the PUSCH.

Also, downlink radio quality information (CQI: Channel Quality Indicator), delivery acknowledgement signals and so on are communicated by the PUCCH. Random access preambles (RA preambles) for establishing connections with cells are communicated by the PRACH.

Figure 16:
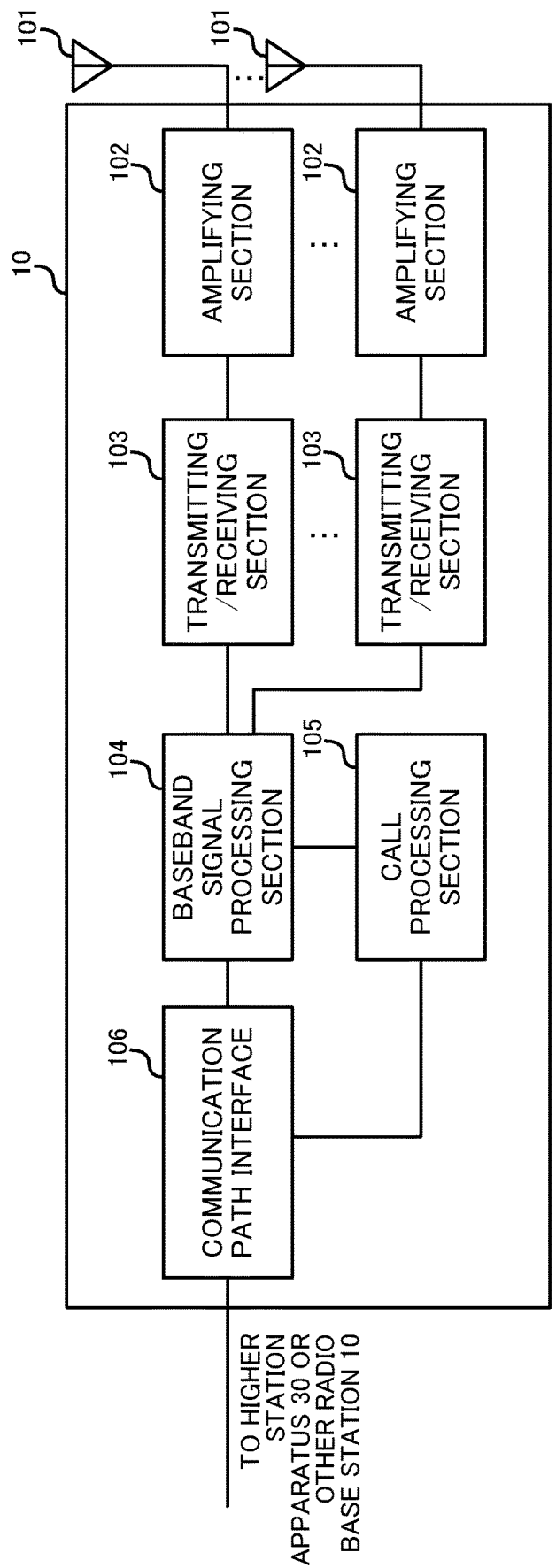
FIG. 16 is a diagram to show an example of an overall structure of a radio base station according to an embodiment of the present invention.

FIG. 16 is a diagram to show an example of an overall structure of a radio base station 10 (which may be either a radio base station 11 or 12) according to the present embodiment. The radio base station 10 has a plurality of transmitting/receiving antennas 101 for MIMO communication, amplifying sections 102, transmitting/receiving sections 103, a baseband signal processing section 104, a call processing section 105 and a communication path interface 106. Note that the transmitting/receiving sections 103 may be comprised of transmitting sections and receiving sections.

User data to be transmitted from the radio base station 10 to a user terminal 20 on the downlink is input from the higher station apparatus 30 to the baseband signal processing section 104, via the communication path interface 106.

Given the user data, the baseband signal processing section 104 performs transmission processes such as a PDCP (Packet Data Convergence Protocol) layer process, division and coupling of user data, RLC (Radio Link Control) layer transmission processes such as an RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Also, the baseband signal processing section 104 reports, to the user terminal 20, control information for allowing communication in the cell, through higher layer signaling (for example, RRC signaling, broadcast information and so on). The information for allowing communication in the cell includes, for example, the system bandwidth on the uplink, the system bandwidth on the downlink, and so on.

Also, assist information (for example, DL TPC information and so on) that relates to unlicensed band communication may be reported from a radio base station (for example, the radio base station 11) to the user terminal 20 in a licensed band.

Each transmitting/receiving section 103 converts baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101. For the transmitting/receiving sections 103, transmitters/receivers, transmitting/receiving circuits or transmitting/receiving devices that can be described based on common understanding of the technical field to which the present invention pertains can be used.

Meanwhile, as with uplink signals, radio frequency signals that are received in each transmitting/receiving antenna 101 are amplified in each amplifying section 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, the user data that is included in the input uplink signals is subjected to a fast Fourier transform (FFT) process, an inverse discrete Fourier transform (IDFT) process, error correction decoding, a MAC retransmission control receiving process and RLC layer and PDCP layer receiving processes, and the result is forwarded to the higher station apparatus 30 via the communication path interface 106. The call processing section 105 performs call processing such as setting up and releasing communication channels, manages the state of the radio base station 10 and manages the radio resources.

The communication path interface 106 transmits and receives signals to and from the higher station apparatus 30 via a predetermined interface. The communication path interface 106 transmits and receives signals to and from neighboring radio base stations 10 (backhaul signaling) via an inter-base station interface (for example, optical fiber, the X2 interface, etc.). For example, the communication path interface 106 may transmit and receive TDD UL/DL configurations, special subframe configurations, sensing subframe configurations, sensing patterns and so on with neighboring radio base stations 10.

Figure 17:
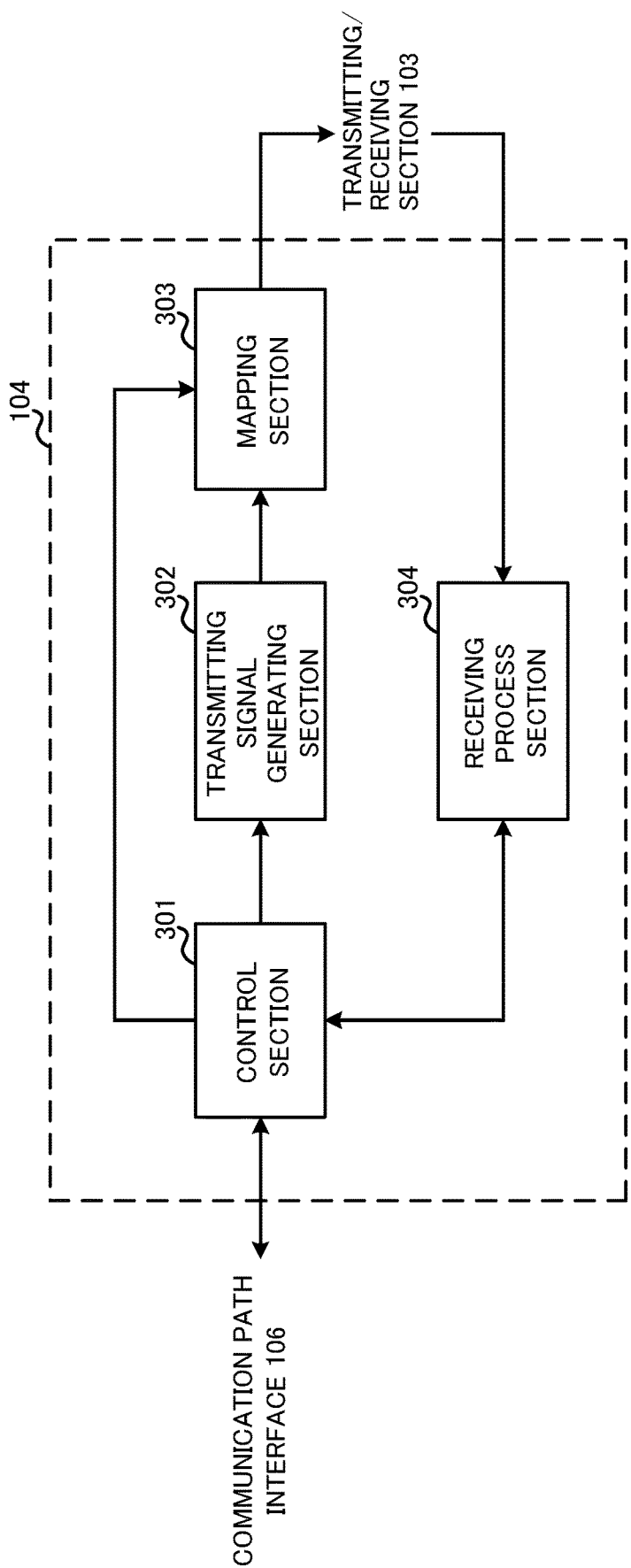
FIG. 17 is a diagram to show an example of a functional structure of a radio base station according to an embodiment of the present invention.

FIG. 17 is a diagram to show an example of a functional structure of a radio base station according to the present embodiment. Note that, although FIG. 17 primarily shows functional blocks that pertain to characteristic parts of the present embodiment, the radio base station 10 has other functional blocks that are necessary for radio communication as well.

As shown in FIG. 17, the baseband signal processing section 104 provided in the radio base station 10 has a control section (scheduler) 301, a transmission signal generating section 302, a mapping section 303 and a receiving process section 304.

The control section (scheduler) 301 controls the scheduling of (for example, allocates resources to) downlink data signals that are transmitted in the PDSCH and downlink control signals that are communicated in the PDCCH and/or the enhanced PDCCH (EPDCCH). Also, the control section 301 controls the scheduling of downlink reference signals such as system information, synchronization signals, the CRS (Cell-specific Reference Signal), the CSI-RS (Channel State Information Reference Signal) and so on. Also, the control section 301 also controls the scheduling of uplink data signals that are transmitted in the PUSCH, uplink control signals that are transmitted in the PUCCH and/or the PUSCH, RA preambles that are transmitted in the PRACH, and so on. Note that, when a licensed band and an unlicensed band are scheduled with one control section (scheduler) 301, the control section 301 might control communication in licensed band cells and unlicensed band cells. For the control section 301, a controller, a control circuit or a control device that can be described based on common understanding of the technical field to which the present invention pertains can be used.

Also, the control section 301 controls the sensing patterns and/or the sensing subframe configurations which the user terminals 20 use. For example, the control section 301 may determine sensing patterns in association with TDD UL/DL configurations (first embodiment). Also, the control section 301 may determine sensing patterns without associating these with TDD UL/DL configurations (second embodiment).

Note that the control section 301 may judge the state of interference in the radio base station 10 and/or the user terminals 20 by using the measurement results in the receiving process section 304, feedback reports from the user terminals 20, and so on, and determine the sensing patterns and/or the sensing subframe configurations. Also, the number of user terminals in cells, each user terminal's priority in transmission, uplink/downlink traffic and so on may be used to determine the sensing patterns and/or the sensing subframe configurations.

The control section 301 outputs the determined sensing patterns and/or sensing subframe configurations to the transmission signal generating section 302, and controls the mapping section 303 to map signals including these pieces of information. Note that the sensing patterns and/or the like may be associated with other pieces of information and reported implicitly, instead of being reported in explicit signals.

The transmission signal generating section 302 generates DL signals (downlink control signals, downlink data signals, downlink reference signals and so on) based on commands from the control section 301, and outputs these signals to the mapping section 303. For example, the transmission signal generating section 302 generates DL assignments, which report downlink signal allocation information, and UL grants, which report uplink signal allocation information, based on commands from the control section 301. Also, the downlink data signals are subjected to a coding process and a modulation process, based on coding rates and modulation schemes that are determined based on channel state information (CSI) from each user terminal 20. For the transmission signal generating section 302, a signal generator or a signal generating circuit that can be described based on common understanding of the technical field to which the present invention pertains can be used.

The mapping section 303 controls the allocation of the downlink signals generated in the transmission signal generating section 302 to radio resources based on commands from the control section 301. For the mapping section 303, a mapping circuit or a mapper that can be described based on common understanding of the technical field to which the present invention pertains can be used.

The receiving process section 304 performs receiving processes (for example, demapping, demodulation, decoding and so on) of UL signals (for example, delivery acknowledgement signals (HARQ-ACK), data signals that are transmitted in the PUSCH and so on) transmitted from the user terminals. Also, the receiving process section 304 may measure the received power (RSRP), channel states and so on by using the received signals. Note that the processing results and measurement results may be output to the control section 301. For the receiving process section 304, a signal processor/measurer, or a signal processing circuit/measurement circuit that can be described based on common understanding of the technical field to which the present invention pertains can be used.

Also, the receiving process section 304 receives and demodulates the PUSCH in the radio resources designated by predetermined information, based on commands from the control section 301.

Figure 18:
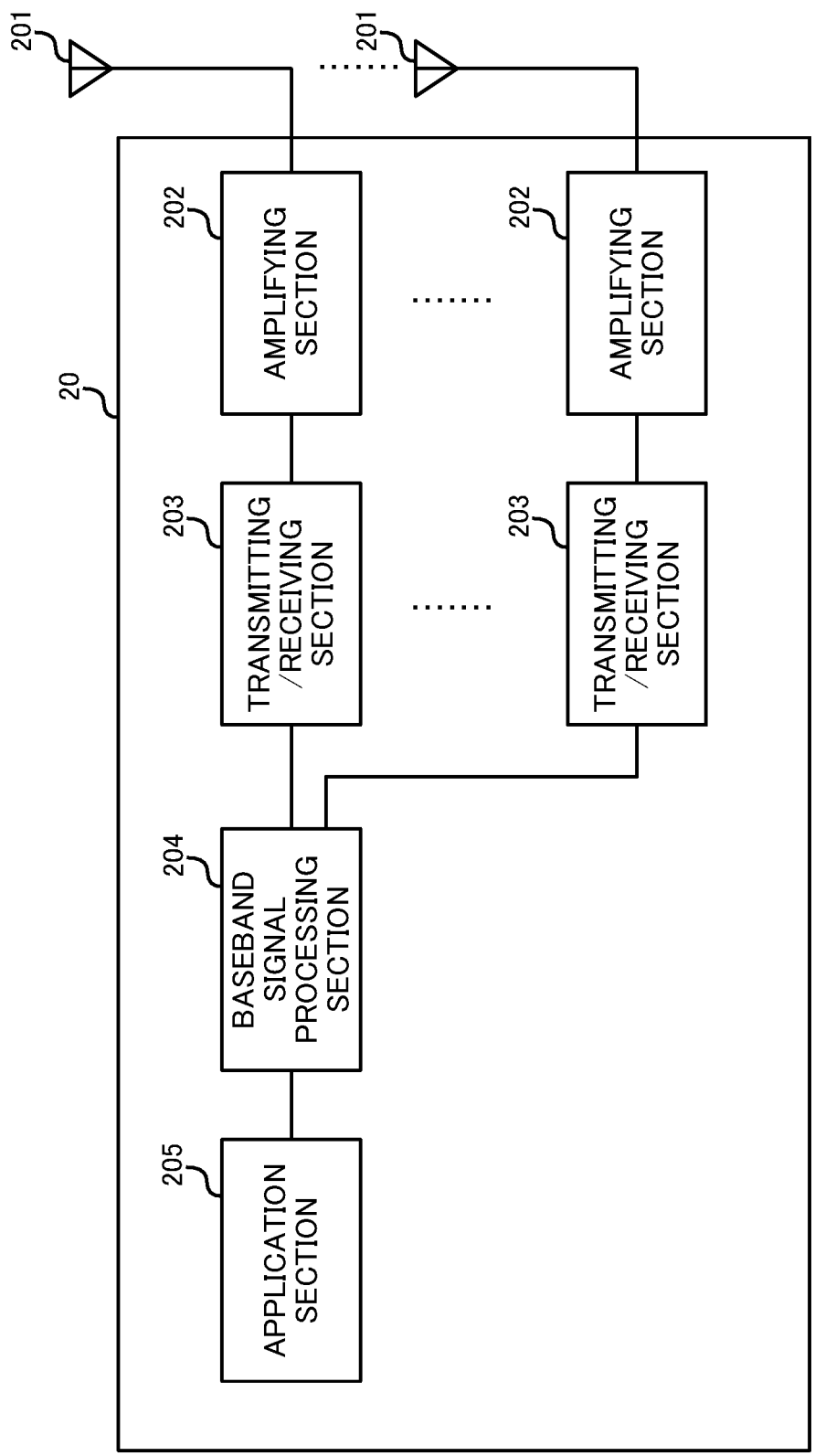
FIG. 18 is a diagram to show an example of an overall structure of a user terminal according to an embodiment of the present invention.

FIG. 18 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signals are subjected to frequency conversion and converted into the baseband signal in the transmitting/receiving sections 203, and then output to the baseband signal processing section 204. For the transmitting/receiving sections 203, transmitters/receivers, transmitting/receiving circuits or transmitting/receiving devices that can be described based on common understanding of the technical field to which the present invention pertains can be used. The transmitting/receiving sections 203 are capable of transmitting/receiving UL/DL signals in unlicensed bands. Note that the transmitting/receiving section 203 may be capable of transmitting/receiving UL/DL signals in licensed bands as well.

In the baseband signal processing section 204, the baseband signals that are input are subjected to an FFT process, error correction decoding, a retransmission control receiving process and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. In the baseband signal processing section 204, a retransmission control transmission process (for example, an HARQ transmission process), channel coding, precoding, a discrete Fourier transform (DFT) process, an IFFT process and so on are performed, and the result is forwarded to each transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 19:
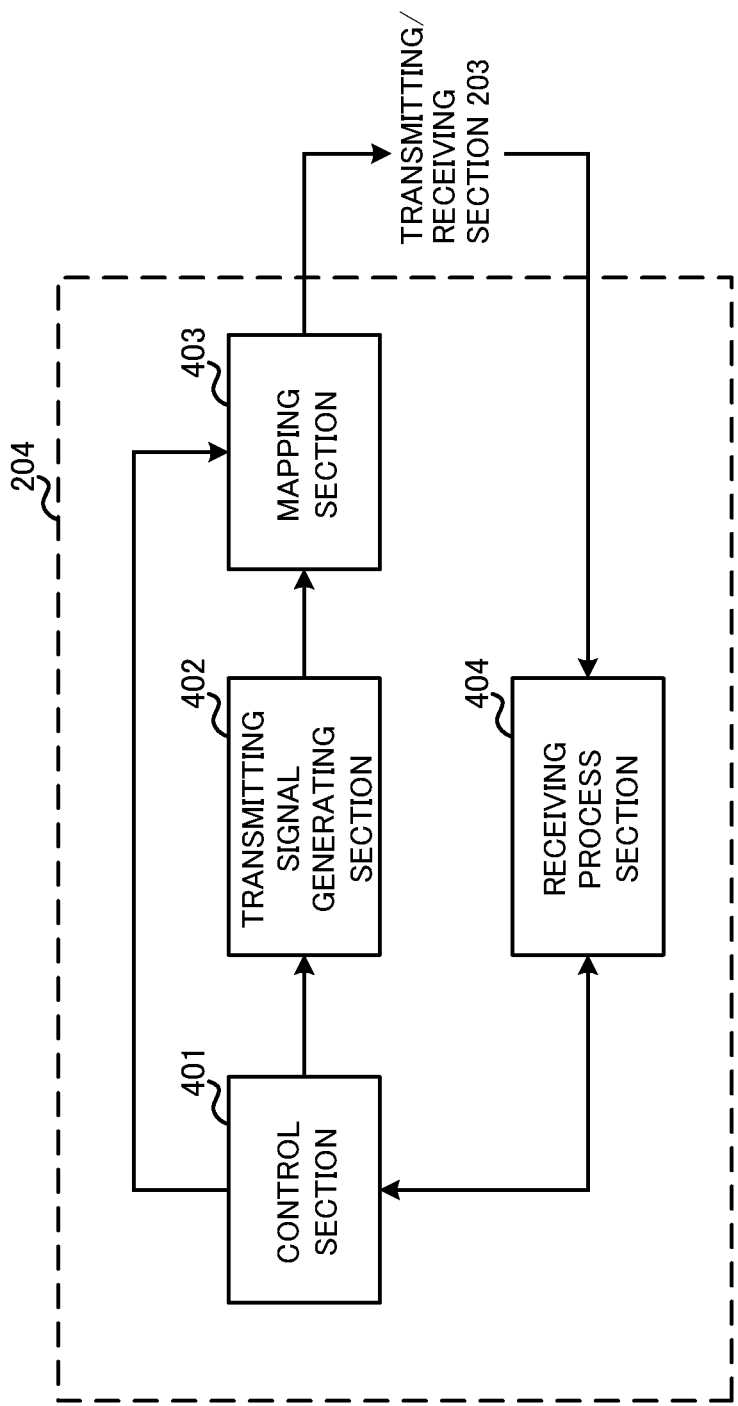
FIG. 19 is a diagram to show an example of a functional structure of a user terminal according to an embodiment of the present invention.

FIG. 19 is a diagram to show an example of a functional structure of a user terminal according to the present embodiment. Note that, although FIG. 19 primarily shows functional blocks that pertain to characteristic parts of the present embodiment, the user terminal 20 has other functional blocks that are necessary for radio communication as well.

As shown in FIG. 19, the baseband signal processing section 204 provided in the user terminal 20 has a control section 401, a transmission signal generating section 402, a mapping section 403 and a receiving process section 404.

The control section 401 acquires the downlink control signals (signals transmitted in the PDCCH/EPDCCH) and downlink data signals (signals transmitted in the PDSCH) transmitted from the radio base station 10 from the received signal processing section 404. The control section 401 controls the generation of uplink control signals (for example, delivery acknowledgement signals (HARQ-ACK) and so on) and uplink data signals based on the results of judging whether or not retransmission control is necessary for downlink control signals, downlink data signals and so on. To be more specific, the control section 401 controls the transmission signal generating section 402 and the mapping section 403. For the control section 401, a controller or a control device that can be described based on common understanding of the technical field to which the present invention pertains can be used.

Also, the control section 401 has a function for learning the buffer size of UL data that is input from the application section 205, and, when there is UL data, controls the receiving process section 404 to carry out UL-LBT in sensing subframes. Note that it is equally possible to make the receiving process section 404 perform UL-LBT even when there is no UL data.

Also, the control section 401 may apply control so that information that is useful for PUSCH transmission is transmitted in the report period in accordance with the results of LBT input from the receiving process section 404.

The control section 401 controls predetermined subframes as sensing subframes based on the sensing pattern. For example, the control section 401 may learn the sensing pattern from an explicit report (first and second embodiments), or learn the sensing pattern implicitly (second embodiment). For example, the control section 401 may count the number of times sensing is tried in the receiving process section 404, and calculate and acquire the sensing pattern based on the number of times sensing is tried (see, for example, table 1).

Also, the control section 401 may switch between using each sensing subframe as a sensing subframe and as a special subframe (third embodiment). For example, when a subframe is designated as a sensing subframe, the control section 401 controls the receiving process section 404 to try receiving the PDCCH in a predetermined OFDM symbol period based on the PCFICH. Then, when a report arrives from the receiving process section 404 to the effect that a DL assignment has been detected in the sensing subframe, the control section 401 makes the receiving process section 404 carry out DL reception or carry out UL-LBT.

The transmission signal generating section 402 generates UL signals (uplink control signals, uplink data signals, uplink reference signals and so on) based on commands from the control section 401, and outputs these signals to the mapping section 403. For example, the transmission signal generating section 402 generates uplink control signals such as delivery acknowledgement signals (HARQ-ACK), channel state information (CSI) and so on, based on commands from the control section 401. Also, the transmission signal generating section 402 generates uplink data signals based on commands from the control section 401. Note that, when a UL grant is contained in a downlink control signal reported from the radio base station, the control section 401 commands the uplink data signal 403 to generate an uplink data signal. For the transmission signal generating section 402, a signal generator or a signal generating circuit that can be described based on common understanding of the technical field to which the present invention pertains can be used.

The mapping section 403 maps the uplink signals generated in the transmission signal generating section 402 to radio resources based on commands from the control section 401, and outputs these to the transmitting/receiving sections 203. For the mapping section 403, a mapping circuit or a mapper that can be described based on common understanding of the technical field to which the present invention pertains can be used.

The receiving process section 404 performs receiving processes (for example, demapping, demodulation, decoding and so on) of the DL signals transmitted in licensed bands and unlicensed bands (for example, downlink control signals transmitted from the radio base station, downlink data signals transmitted in the PDSCH, and so on). When receiving the TDD UL/DL configuration, the special subframe configuration, the sensing subframe configuration, the sensing pattern and so on from the radio base station 10, the receiving process section 404 outputs these to the control section 401. Also, the receiving process section 404 may measure the received power (RSRP), channel states and so on by using these received signals. Note that the processing results and measurement results may be output to the control section 401. For the receiving process section 404, a signal processor/measurer, or a signal processing circuit/measurement circuit that can be described based on common understanding of the technical field to which the present invention pertains can be used.

The receiving process section 404 executes LBT in an unlicensed band by using predetermined subframes (for example, special subframes) as sensing subframes based on commands from the control section 401, and outputs the results of LBT (for example, the results of judging whether or not the channel state is clear or busy) to the control section 401.

Also, in a subframes that are designated as a sensing subframe, the receiving process section 404 tries to receive the PDCCH in a predetermined OFDM symbol period based on commands from the control section 401, based on the PCFICH. Then, when the receiving process section 404 detects a DL assignment to designate the PDSCH for the subject terminal, the receiving section 404 sends a report to that effect to the control section 401.

Note that the block diagrams that have been used to describe the above embodiments show blocks in function units. These functional blocks (components) may be implemented in arbitrary combinations of hardware and software. Also, means for implementing each functional block is not particularly limited. That is, each functional block may be implemented with one physically-integrated device, or may be implemented by connecting two physically separate devices via radio or wire and using these multiple devices.

For example, part or all of the functions of radio base stations 10 and user terminals 20 may be implemented using hardware such as ASICs (Application-Specific Integrated Circuits), PLDs (Programmable Logic Devices), FPGAs (Field Programmable Gate Arrays), and so on. Also, the radio base stations 10 and the user terminals 20 may be implemented with a computer device that includes a processor (CPU), a communication interface for connecting with networks, a memory and a computer-readable storage medium that holds programs.

Here, the processor and the memory are connected with a bus for communicating information. Also, the computer-readable recording medium is a storage medium such as, for example, a flexible disk, an optomagnetic disk, a ROM, an EPROM, a CD-ROM, a RAM, a hard disk and so on. Also, the programs may be transmitted from the network through, for example, electric communication channels. Also, the radio base stations 10 and the user terminals 20 may include input devices such as input keys and output devices such as displays.

The functional structures of the radio base stations 10 and the user terminals 20 may be implemented with the above-described hardware, may be implemented with software modules that are executed on the processor, or may be implemented with combinations of both. The processor controls the whole of the user terminals by allowing the operating system to work. Also, the processor reads programs, software modulates and data from the storage medium into the memory, and executes various types of processes. Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a processor that determines a sensing period based on first information regarding a timing of a sensing that is notified by System Information Block (SIB) 1, and on second information regarding a timing of a sensing that is notified by higher layer signaling; and
   a receiver that performs the sensing before transmitting signals in the sensing period,
   wherein the sensing period includes a period for performing sensing, and a period for switching between transmission and reception, and
   wherein the processor controls the period for performing sensing based on the second information regarding the timing of the sensing and a detection of an uplink grant.

2. The terminal according to claim 1, wherein an information about a configuration of sensing is associated with a TDD UL/DL configuration.

3. The terminal according to claim 1, wherein the sensing period includes a period to transmit predetermined information about Physical Uplink Shared Channel, PUSCH.

4. A radio communication method for a terminal comprising:
   determining a sensing period based on first information regarding a timing of a sensing that is notified by System Information Block (SIB) 1, and on second information regarding a timing of a sensing that is notified by higher layer signaling;
   performing the sensing before transmitting signals in the sensing period; and
   controlling the period for performing sensing based on the second information regarding the timing of the sensing and a detection of an uplink grant,
   wherein the sensing period includes a period for performing sensing, and a period for switching between transmission and reception.

* * * * *